United States Patent
Wang et al.

(10) Patent No.: US 9,954,968 B2
(45) Date of Patent: Apr. 24, 2018

(54) REMOTE ACCESS GATEWAY CONFIGURABLE CONTROL SYSTEM

(71) Applicant: Honeywell International Inc., Morristown, NJ (US)

(72) Inventors: Bo Wang, Tianjin (CN); Patrick Lemire, La Prairie (CA); Cherry Lv, Tianjin (CN)

(73) Assignee: Honeywell International Inc., Morris Plains, NJ (US)

(*) Notice: Subject to any disclaimer, the term of this patent is extended or adjusted under 35 U.S.C. 154(b) by 256 days.

(21) Appl. No.: 14/827,157

(22) Filed: Aug. 14, 2015

(65) Prior Publication Data

US 2015/0350359 A1    Dec. 3, 2015

Related U.S. Application Data

(63) Continuation of application No. 13/621,159, filed on Sep. 15, 2012, now Pat. No. 9,122,255.

(51) Int. Cl.

| | |
|---|---|
| *G05B 15/02* | (2006.01) |
| *G05B 13/02* | (2006.01) |
| *H04L 29/08* | (2006.01) |
| *H04L 29/06* | (2006.01) |
| *H04L 12/28* | (2006.01) |
| *H04L 12/26* | (2006.01) |

(52) U.S. Cl.
CPC .......... *H04L 67/2804* (2013.01); *G05B 15/02* (2013.01); *H04L 12/2834* (2013.01); *H04L 65/102* (2013.01); *H04L 67/025* (2013.01); *G05B 2219/25168* (2013.01); *G05B 2219/2614* (2013.01); *G05B 2219/31348* (2013.01); *H04L 43/10* (2013.01); *H04L 67/142* (2013.01); *H04L 67/145* (2013.01); *Y02B 30/00* (2013.01)

(58) Field of Classification Search
None
See application file for complete search history.

(56) References Cited

U.S. PATENT DOCUMENTS

| | | | |
|---|---|---|---|
| 6,119,143 A | 9/2000 | Dias et al. | |
| 6,826,267 B2 | 11/2004 | Daum et al. | |
| 7,103,511 B2 | 9/2006 | Petite | |
| 7,205,892 B2 | 4/2007 | Luebke et al. | |

(Continued)

FOREIGN PATENT DOCUMENTS

| | | | |
|---|---|---|---|
| EP | 2232779 B1 * | 8/2011 | ............ H04L 12/28 |
| GB | 2381406 | 4/2003 | |
| WO | WO 97/30392 | 8/1997 | |

OTHER PUBLICATIONS

Cowan et al., "Monitoring Physical Threats in the Data Center," American Power Conversion, White Paper #102, 15 pages, 2006.

(Continued)

*Primary Examiner* — Ronald Hartman, Jr.
(74) *Attorney, Agent, or Firm* — Seager, Tufte & Wickhem, LLP

(57) ABSTRACT

A remote access gateway configurable control system. There may be a series of control commands to set or adjust a gateway device's running parameters and modify the behavior of the device or start process action. There may be configuration commands for remote control of the device and server commands for unattended devices.

20 Claims, 39 Drawing Sheets

(56) References Cited

U.S. PATENT DOCUMENTS

| | | | |
|---|---|---|---|
| 7,383,148 B2 * | 6/2008 | Ahmed | F24F 11/0086 |
| | | | 702/127 |
| 7,509,400 B1 | 3/2009 | Tanner et al. | |
| 7,664,573 B2 * | 2/2010 | Ahmed | G05B 15/02 |
| | | | 700/19 |
| 7,881,208 B1 | 2/2011 | Nosella et al. | |
| 7,952,485 B2 | 5/2011 | Schechter et al. | |
| 8,189,572 B2 | 5/2012 | Wu | |
| 8,230,466 B2 * | 7/2012 | Cockrell | H04L 12/66 |
| | | | 725/81 |
| 8,269,622 B2 | 9/2012 | Chan et al. | |
| 8,718,707 B2 * | 5/2014 | Crawford | G05D 23/1917 |
| | | | 455/556.1 |
| 8,760,269 B2 * | 6/2014 | Feldstein | G06F 1/1626 |
| | | | 340/13.22 |
| 9,122,255 B2 | 9/2015 | Wang et al. | |
| 9,307,344 B2 * | 4/2016 | Rucker | H04W 4/005 |
| 9,405,395 B2 * | 8/2016 | Feldstein | F16M 11/041 |
| 9,411,703 B2 * | 8/2016 | Simons | F24F 11/0086 |
| 9,473,324 B2 * | 10/2016 | Cockrell | H04L 12/66 |
| 9,477,241 B2 * | 10/2016 | Schultz | G05D 23/1905 |
| 9,488,994 B2 * | 11/2016 | Zywicki | G05D 23/1905 |
| 9,657,957 B2 * | 5/2017 | Bergman | F24F 11/00 |
| 9,686,184 B2 * | 6/2017 | Rucker | H04L 45/306 |
| 2005/0154494 A1 * | 7/2005 | Ahmed | G05B 15/02 |
| | | | 700/275 |
| 2006/0149414 A1 | 7/2006 | Archacki, Jr. et al. | |
| 2008/0117922 A1 * | 5/2008 | Cockrell | H04L 12/66 |
| | | | 370/401 |
| 2012/0081466 A1 | 3/2014 | Huapeng et al. | |
| 2012/0082068 A1 | 3/2014 | Lv et al. | |
| 2012/0082177 A1 | 3/2014 | Lemire et al. | |

OTHER PUBLICATIONS

Honeywell, "RedLINK Internet Gateway," Installation Instructions, 12 pages, 2011.
Honeywell, "THM6000R RedLINK Internet Gateway," Operating Manual, 11 pages, 2011.
Honeywell, RedINK Internet Gateway Packaging, 4 pages, 2011.
Wikipedia, "Gateway Load Balancing Protocol," 1 page, on or prior to Nov. 9, 2011.

* cited by examiner

Response/Report Header — 327

| Fields | bits | Name | Description |
|---|---|---|---|
| 0-1 | 0-15 | Command request | The requested command Application Msg (RNP) errors will use 0x0000 |
| 2-3 | 0-15 | Return code | Returned code for the command (refer to ISR-1275), 0x0 for success. |
| - | | Data | Command response/report data if any |

*Figure 18*

Device Information Response (0x0006)

| Fields | bits | Name | Description |
|---|---|---|---|
| 4-9 | | MAC ID | MAC ID of the device |
| 10-13 | | Software version | App Major Rev [byte] = Major Revision of application code.<br>App Main Rev [byte] = Main Revision of application code.<br>App Minor Rev [byte] = Minor Revision of application code.<br>App Patch Rev [byte] = Patch Revision of application code. |
| 14-29 | | Hardware revision | Board Part Number (16 char ASCII); |
| 30-45 | | Reserved | 16 bytes |

| | | RNP Message | |
|---|---|---|---|
| 0-1 | 0-15 | Domain ID | Group domain of the RNP message in the context. |
| 2-3 | 0-15 | RNP Msg Length | Size of the RNP message to be sent (from byte #4). |
| 4 | 14-15 | Sequence / Service | Sequence number of the requested change. RF-1 (AlphaSystemSpec.doc) |
| 4-5 | 0-13 | Message Class | RNP message ID |
| 6-7 | 0-15 | Instance | The Instance field identifies specific instances of a message class. |
| 8 | 6-7 | Service | Encoded on a 2 bit field:<br><br>0 = Report Query<br><br>1 = Report<br><br>2 = Change Request |
| 8 | 0-5 | Data Length | Length of the Data field |
| 9-72 | 0-7 | RNP Data | Data field, can have from 0 to 63 bytes. |

*Figure 21*

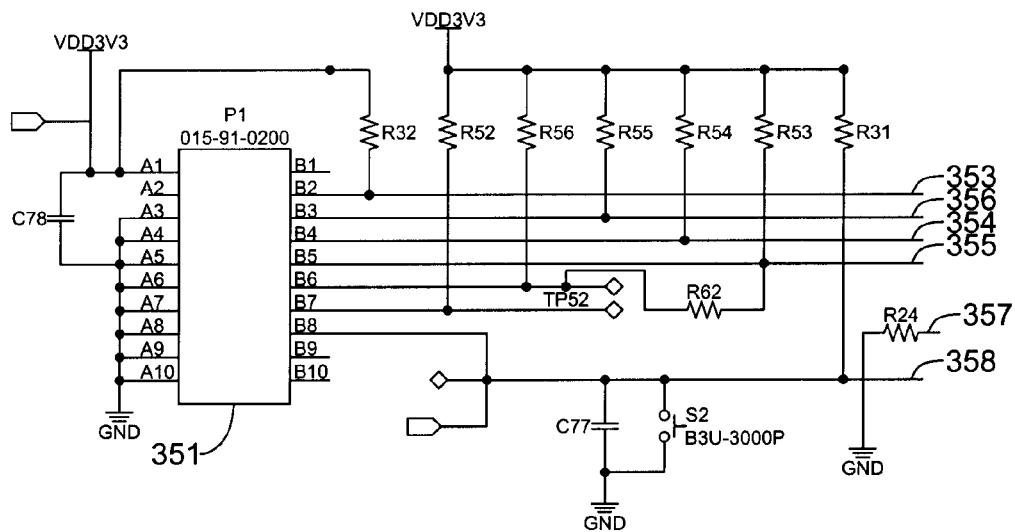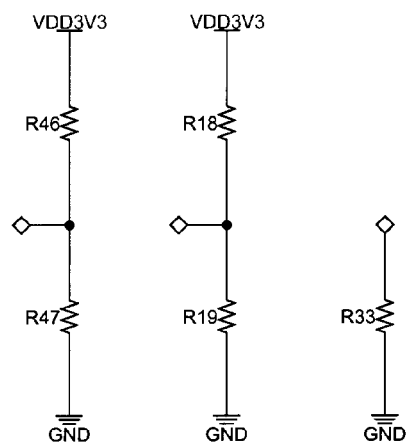
Figure 22D

REMOTE ACCESS GATEWAY CONFIGURABLE CONTROL SYSTEM

This application is a continuation of U.S. patent application Ser. No. 13/621,159, filed Sep. 15, 2012. U.S. patent application Ser. No. 13/621,159, filed Sep. 15, 2012, is hereby incorporated by reference.

BACKGROUND

The present disclosure pertains to control, storage, reporting and selection systems. Particularly, the disclosure pertains to a communication system using a gateway device for expanding a user interface.

SUMMARY

The disclosure reveals a remote access gateway configurable control system. There may be a series of control commands to set or adjust a gateway device's running parameters and modify the behavior of the device or start process action. There may be configuration commands for remote control of the device and server commands for unattended devices.

BRIEF DESCRIPTION OF THE DRAWING

FIG. 18 is a diagram of a table showing a response/report having a header showing fields, bits, name and description;

FIG. 19 is a diagram of a table showing an example of a device information response;

FIG. 21 is a diagram of a table showing a structure for encapsulating information to be sent to a service.

DESCRIPTION

Figure 1:
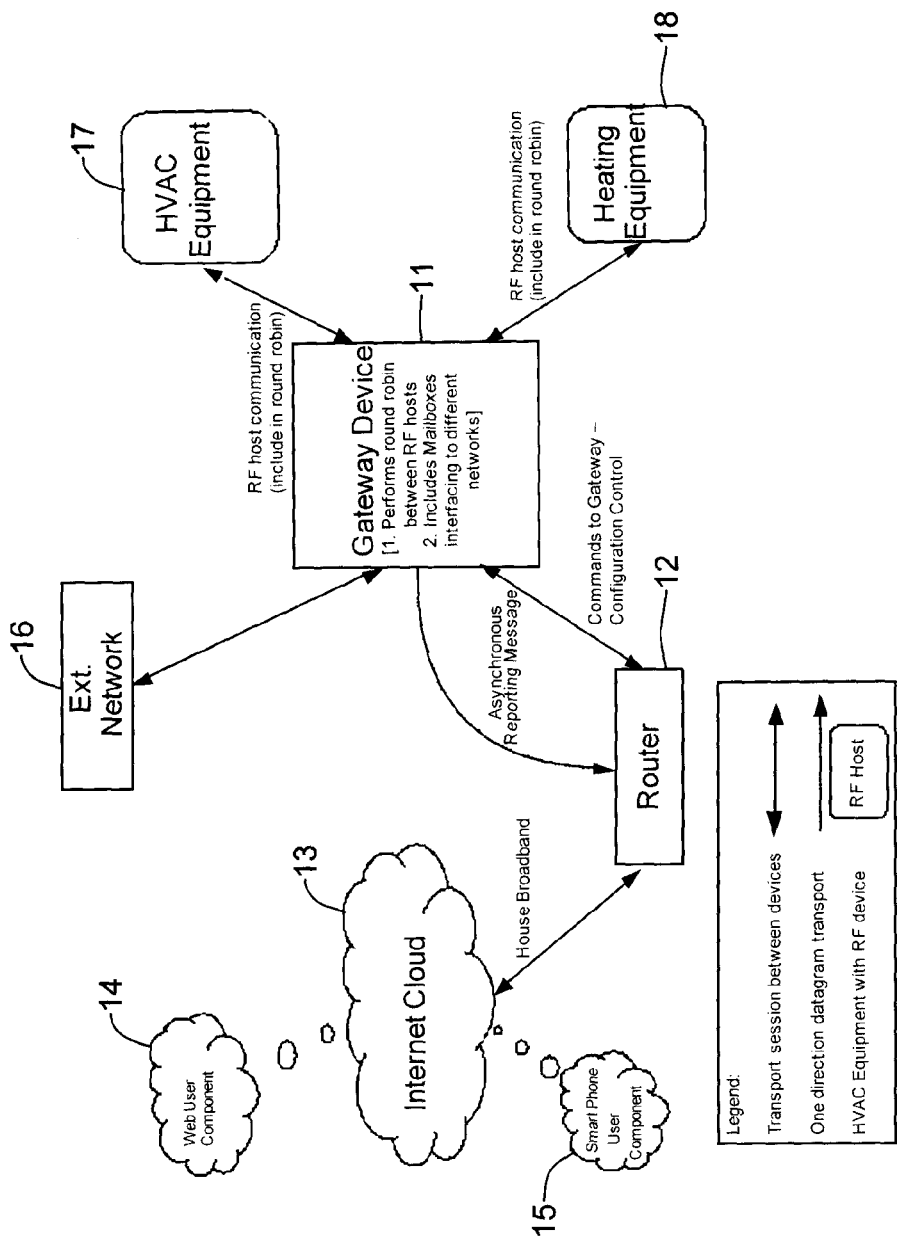
FIG. 1 is a diagram of a gateway device and components outside the device.

There may be remote access gateway configurable control. The gateway device may be an embedded computer with a limited user interface. The device may have, for example, just one button and three LED's. A challenge may be to configure the device and remotely command the device to change its behavior (i.e., registration, reset, get information, change of operations, and so on). The present approach may permit an installer or user to remotely configure the gateway device as needed and modify the behavior of the device remotely by a server application. The approach may also permit control of a gateway start process action at a user's command. This may help the installer and users to setup or control more than one device at a time, reduce the cost for managing the gateway, and make the configuration much easier to achieve.

The present approach may provide for development of a series of control commands to set or adjust the gateway running parameters and modify the behavior of the device, or start a process action. There may be configuration commands to control a device remotely. Server commands may be used for unattended devices, with no maintenance.

For instance, a device may be able to set up a ping rate to modify the ping behavior of the gateway and/or prevent it from sending messages. This capability may be used to reduce traffic from gateways that are not registered to a particular user. It may also be used when a gateway has been compromised due to hacking. It may be able to reset the gateway remotely to avoid doing it on the device by removing the power. It may be able to get gateway device information and current running status remotely and provide a server or user for an application. The command operation may also be used for data transmission, like sending a new software version to the gateway device.

Since the gateway may be done for remote access of the home HVAC device, one may build a web server application to operate the home HVAC device. It may adopt the web server application and integrate the gateway device control page to provide an installer or user an ability to operate the home HVAC device. Also, the gateway may need to add software capability for a command response. When the gateway receives the commands from the web application, it may need to act upon the command definition and respond to the server whether it executes a command successfully or not.

There may be an asynchronous reporting mechanism for a remote device in an HVAC environment. When HVAC equipment fails as part of a system installed in a house, an error reporting message may be propagated in the house to a central device with a display to alert the home owner. If the system is connected to a remote access gateway, the information may also be displayed to a user but only when the user connects to its account. The user may need to be alerted urgently. A communication medium may be required when an event is needed to be sent to the server without the user being on its account. Without this, the user may need to be online to see the alert. To resolve this issue, an asynchronous message may be required to be sent to the server.

Using gateway information (i.e., device address), the report information may be sent to the user account and then using a second messaging medium directly to the user messaging device, e.g., email or cellular phone short message service (SMS). An asynchronous message may be sent by a device without user intervention or request.

This asynchronous message may include the gateway device address, the equipment identification and the source message. A unique destination server may need to be defined so that virtually all messages will be saved in a message database. The service application on the account server may parse all of these messages and take action depending on the user configuration for asynchronous events.

When the gateway receives an equipment failure indication, the message may be sent inside an asynchronous message to the server so it can process it. The server may receive it and use the gateway address, the device identification and the message name to select the action to take.

If the message needs to be sent to the house owner, it may send it using the configured messaging type (email or SMS). Then, when the user logs into its account, an alert may be present and inform the user of a problem in the home HVAC system.

There may be a mailbox data storage mechanism for a remote device in an HVAC environment. For an intelligent HVAC system, various HVAC devices may work together by communicating with each other through their specific "language" (i.e., HVAC communication protocol). A remote access gateway device may provide the remote accessibility from other systems to this HVAC system, for example, access to the HVAC information through ethernet. This may require the gateway device to provide the information translation and transmission capabilities between the different systems. There may always be the latency issue for a communication between different systems. The present approach may provide a better user experience when the user accesses the information to an HVAC system remotely by implementing the mailbox data storage mechanism in a gateway device.

The mechanism may be different relative to the usual gateway device mechanism which simply forwards the command and response between two systems. It may provide a mailbox-like data storage mechanism on the remote gateway device.

The device may act as a citizen of the HVAC system, collect the system information regularly and maintain a copy of latest data locally, which can be used to respond to the external access requests in time at any moment. The device may limit the latency for external access and improve the user experience. The mailbox may help to satisfy multiple interfaces.

The mechanism may also introduce an auto update capability which can send the HVAC system information changes to another system automatically once it detects there is a change. The auto update capability may help reflect a change to an external system in time, and help reduce the traffic between different systems because the device can detect the changed section of data automatically and transmit only the change or changes to others.

Another benefit from this mechanism may be that it makes the gateway device more extendable from an architecture perspective. A usual gateway device may provide communication capability between two different systems. But the gateway device with mailbox data storage may extend this capability to N systems (where N>2) because of intelligent logic hardware and software in the system.

The mailbox data storage mechanism may collect the latest HVAC information regularly, respond to the external command with local data immediately, and transmit the changed data out once it is detected there. One may note FIG. 4 with a diagram of a sequence for the mailbox mechanism.

There may be a remote gateway round robin lock mechanism. Marketing requirements may state that a remote gateway needs to communicate to, for instance, four devices or hosts. The whole system may make the user feel that the gateway communicates with multi-hosts synchronously. But the current RF technology cannot necessarily communicate with four RF hosts synchronously. To resolve this issue, it may be required to design a new mechanism (e.g., lock mechanism) in the gateway for the RF interface. By using this mechanism, the user may feel that the gateway would communicate with multi-hosts synchronously, and information from each host may be updated in a timely fashion.

A round robin with a lock mechanism may be created to solve the synchronization issue. The gateway may communicate with only one RF host at a time. There may be a lock mechanism during round robin, which may help service a user request from the cloud to one specific host.

If there is no command from the server (by a remote user) for a specific host, the gateway may switch to communicate to another RF host. The gateway may stay synchronous to the current RF host for a specific period of time and then move to the next RF host. This may permit the gateway to capture the host current status information, such as actual temperature for a thermostat device.

When the gateway is enrolled or linked to more than one RF host, then the round robin mechanism may be started. This may enable the gateway to synchronize the RF communication to the first host in the sequence. The gateway may query this host information for the period allowed relative to this synchronization. Then the gateway may change the synchronization to the following host in the sequence and then send an RF message to that host.

This process may continue until a user logged on the server performs a modification on one of the hosts linked to the remote gateway. The gateway may then interrupt the round robin sequence to perform synchronization to the host to change. Synchronization may be maintained for a specific time. When the synchronization period is over, a quick scheduling period may be started to cycle the other hosts so that the gateway can get status information of the other RF hosts in the sequence within a limited amount of time.

Figure 6:
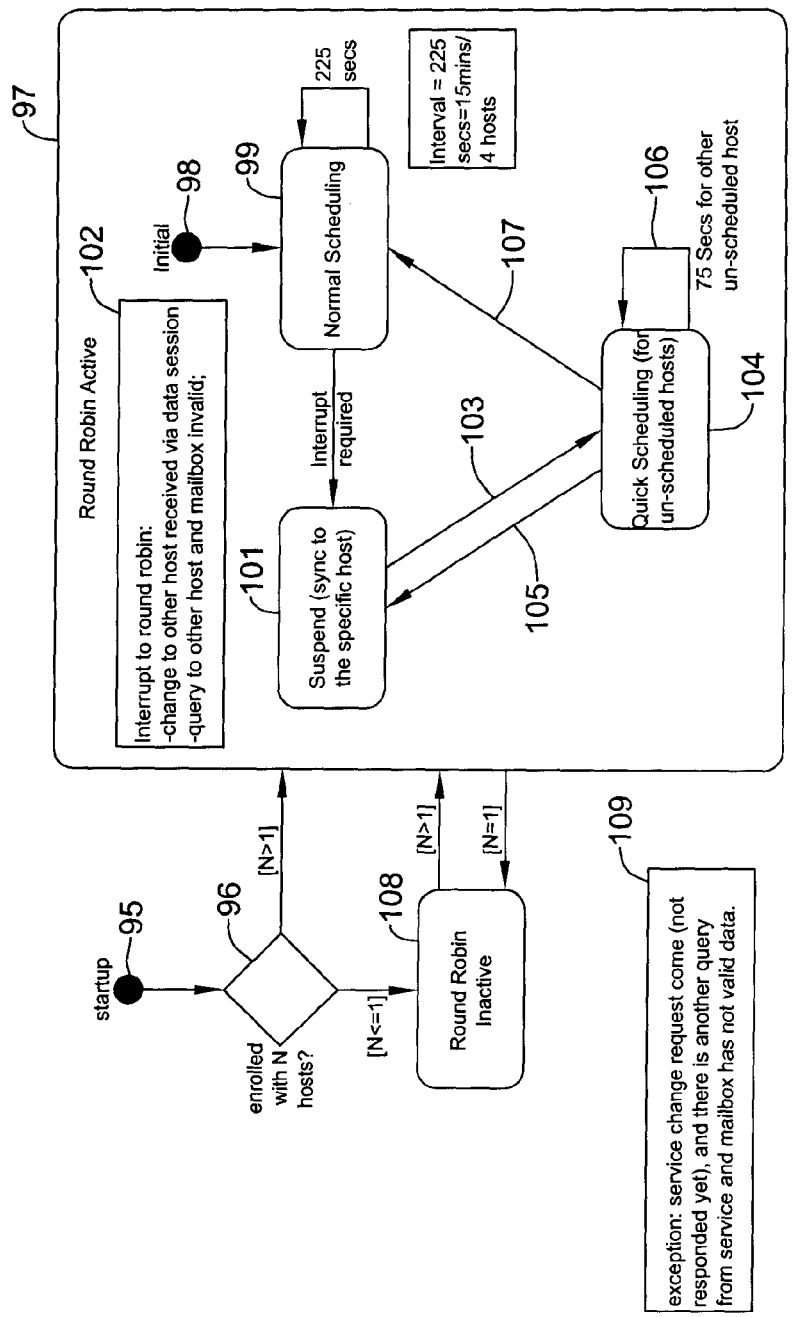
FIG. 6 is a diagram showing an example of a round robin sequence.

A complete sequence cycle time may be limited, so the actual status information of each RF host can be collected within an acceptable period. For a project, the cycle may be set to 15 minutes. So that may give 225 seconds to the gateway to get virtually all of the changes and actual status from one host in a configuration where there are four hosts linked in the RF network. These times and the number of hosts are illustrative examples. FIG. 6 is a diagram showing an example of a round robin sequence.

Another version of a round robin for the gateway system may be utilized. The word "lock" may have a similar meaning as the words "suspend state". "Suspend state" may mean that the system suspends the normal round robin and syncs to a specific host or group to implement a change. Getting updates from all of the hosts within 15 minutes is not necessarily a very strict requirement. Other periods of times for getting updates may be implemented.

The gateway system may continuously work on a high priority task and delay or reject the other low priority tasks within a predefined limited time period. A lock for a service request to ensure the least full loop round robin within 15 minutes is not necessarily a must-have mechanism (i.e., round robin lock).

Highlights of another version of the round robin may incorporate the "round robin lock" and the quick round state being removed. This version may have the round robin suspend state. A suspend state may just implement the service request, but will not necessarily do all of the normal round queries for group information and/or will not necessarily consider the group to have been rounded.

A round robin order may start from a smallest index of the group which has not been rounded. Only when the gateway has queried group information and has been stayed with that group for a round robin period, it may be considered as rounded. For example, with hosts or groups 1, 2, 3, 4, the gateway may get updates from group 2 and receive a service request to switch to group 4. The gateway may return to group 2 to finish the normal round robin, and then go through groups 3 and 4, one by one.

An example of round robin timings may incorporate a normal round robin period of 225 seconds, a round robin suspend period for a change request of 160 seconds, and a round robin suspend period for a query request of 75 seconds. For a specific application of round robin, these time periods may be adjusted.

FIG. 1 is a diagram of a gateway device 11 and its interactions outside the device. Device 11 may have a one-way asynchronous connection with a router 12 and a two-way synchronous connection with router 12. The one-way connection may be for a reporting message. The two-way connection may be for commands to the gateway device and for configuration control. Router 12 may extend the connection to an internet cloud 13. Cloud 13 may be connected to a web user component 14 and a smart phone user component 15. The connection to cloud 13 may incorporate a house broadband. Gateway device 11 may have a connection to an external network 16. Device 11 may have connections to numerous hosts, such as for example, HVAC equipment 17 and heating equipment 18. Other hosts may also be connected to device 11. The connections may be to hosts 17 and 18 via RF communications. Connections to the hosts may be made one at a time with a round robin among the hosts. Round robin may be effected by gateway device 11. Device 11 may also incorporate mailboxes which are interfaced with various networks.

Figure 2:
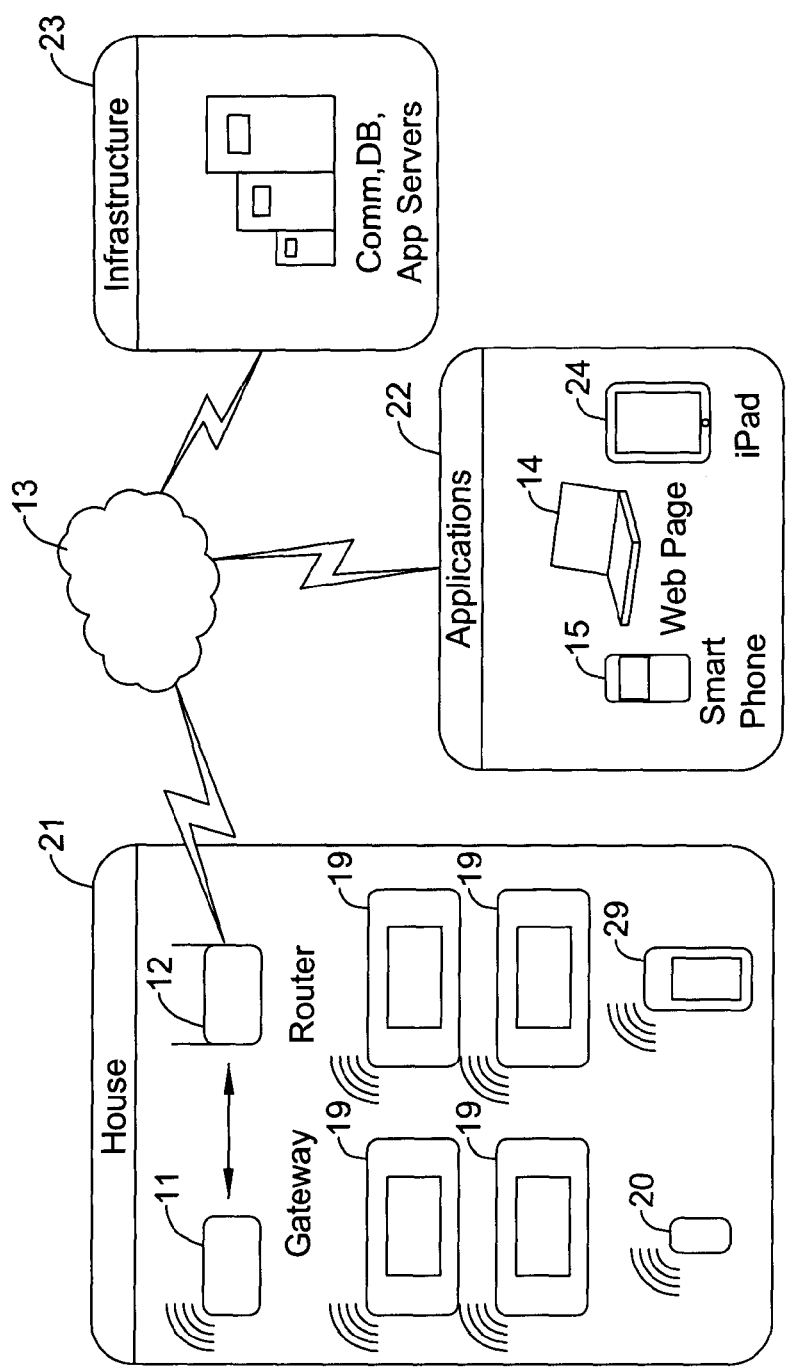
FIG. 2 is a diagram of items interacting with the gateway device.

FIG. 2 is a diagram of additional items in a system. There may be a house 21 with gateway 11 and router 12. Hosts 19, such as thermostats, an outdoor air sensor 20 and a remote thermostat 29, may have RF connections to gateway 11. Router 12 may connect gateway 11 to internet cloud 13. Internet cloud 13 may provide connections to various applicators 22 such as smart phone component 15, web user component 14, iPad™ 24, and so forth. Cloud 13 may provide a connection to a server infrastructure (or server) 23 incorporating communications, databases, application servers, and so forth.

Figure 3:
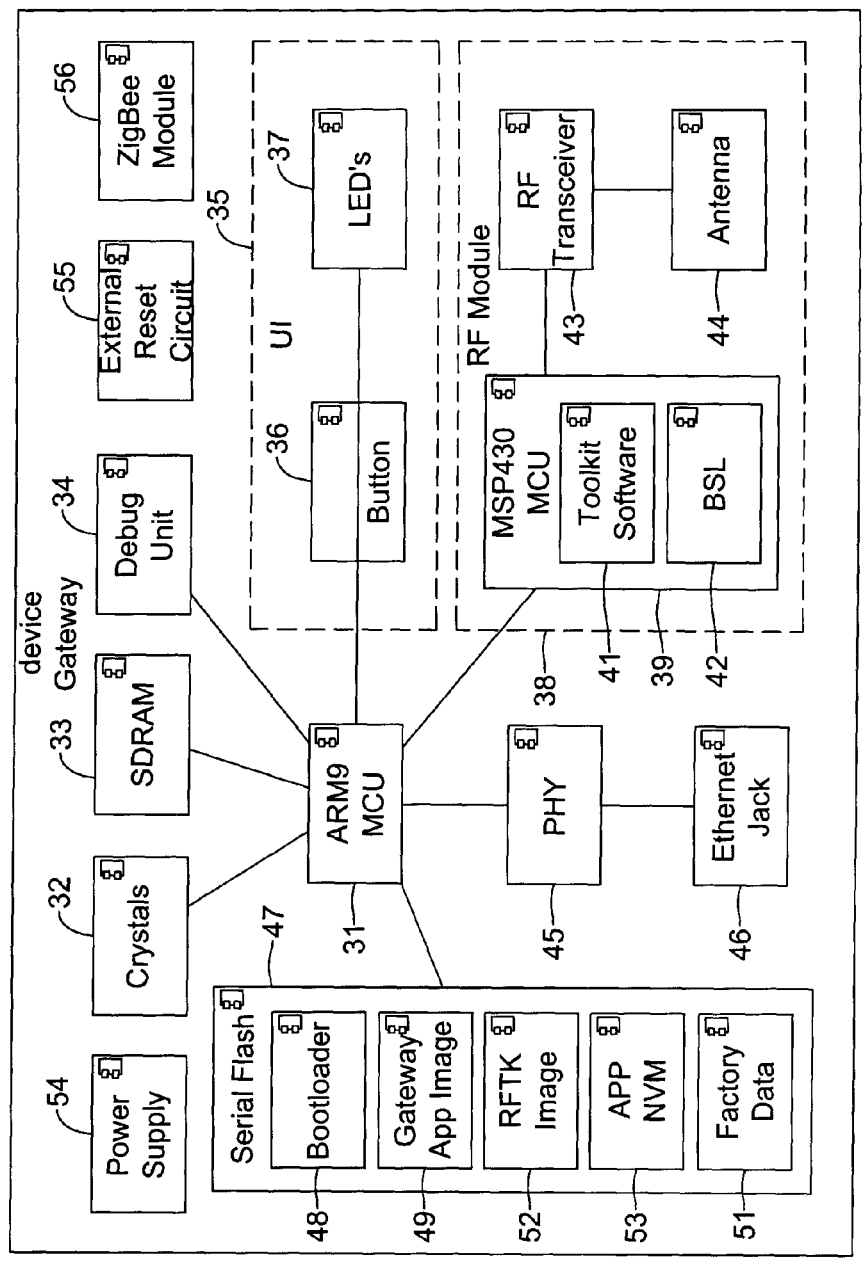
FIG. 3 is a diagram of components incorporated in the gateway device.

FIG. 3 is a diagram of components incorporated in gateway 11. The gateway may incorporate a microprocessor 31 which is a core processor for the gateway to run application software. Processor 31 may be connected to a crystal 32 for a master clock. An SDRAM 33 may be connected to processor 31 for application program running. Processor 31 may be connected to a debug unit 34 which is used for factory test communication and a debugging information output. A user interface unit 35 may be connected to processor 31. Unit 35 may incorporate a button 36 which is dedicated for RF enrollment and compliance with an enrollment interface specification. Unit 35 may also incorporate, for instance, six triple color LED's 37 which indicate gateway working status, power indication and ethernet status indication.

Processor 31 may be connected to an RF module 38. Module 38 may incorporate an RF radio control micro 39 with RF toolkit software running on the micro to provide RF communication capability. Micro 39 may have toolkit software 41 which is responsible for RF communication and communicates with the main processor 31 via a UART port for RF events and messages. Micro 39 may also have a BSL 42 for a programming interface during a field upgrade. Module 38 may have an RF transceiver 43 which is responsible for RF signal transmission and receiving, and connected to micro 39. Two antennas 44 may be connected to transceiver 43.

Processor 31 may be connected to a PHY chip 45 which in turn is connected to an ethernet jack 46 for plug-in in an ethernet cable. Processor 31 may also be connected to a serial flash 47 used to store a customized bootloader 48, gateway application software image 49, factory data 51, RFTK image 52, application run data (NVM) 53, and other items as needed. Bootloader 48 may be run after startup, read a tag of a program image and decide which image should be the one from which to start. Factory data 51 may incorporate a media access control (MAC) identification (ID), an encryption key, hardware revision, and manufacture and test information from the factory. RFTK image 52 may be used for an RF radio module 38 field upgrade. The image 52 may be downloaded from ethernet and then programmed into the RF micro 39 in the field.

A power supply 54 may provide power requirements for components of gateway device 11. Supply 54 may be powered with an external 5 VDC adapter. An external reset circuit 55 may be used as a backup solution for device 11 recovery. A ZigBee module 56 may incorporate a module space, test pins and a serial port, if needed, for device 11.

Figure 4:
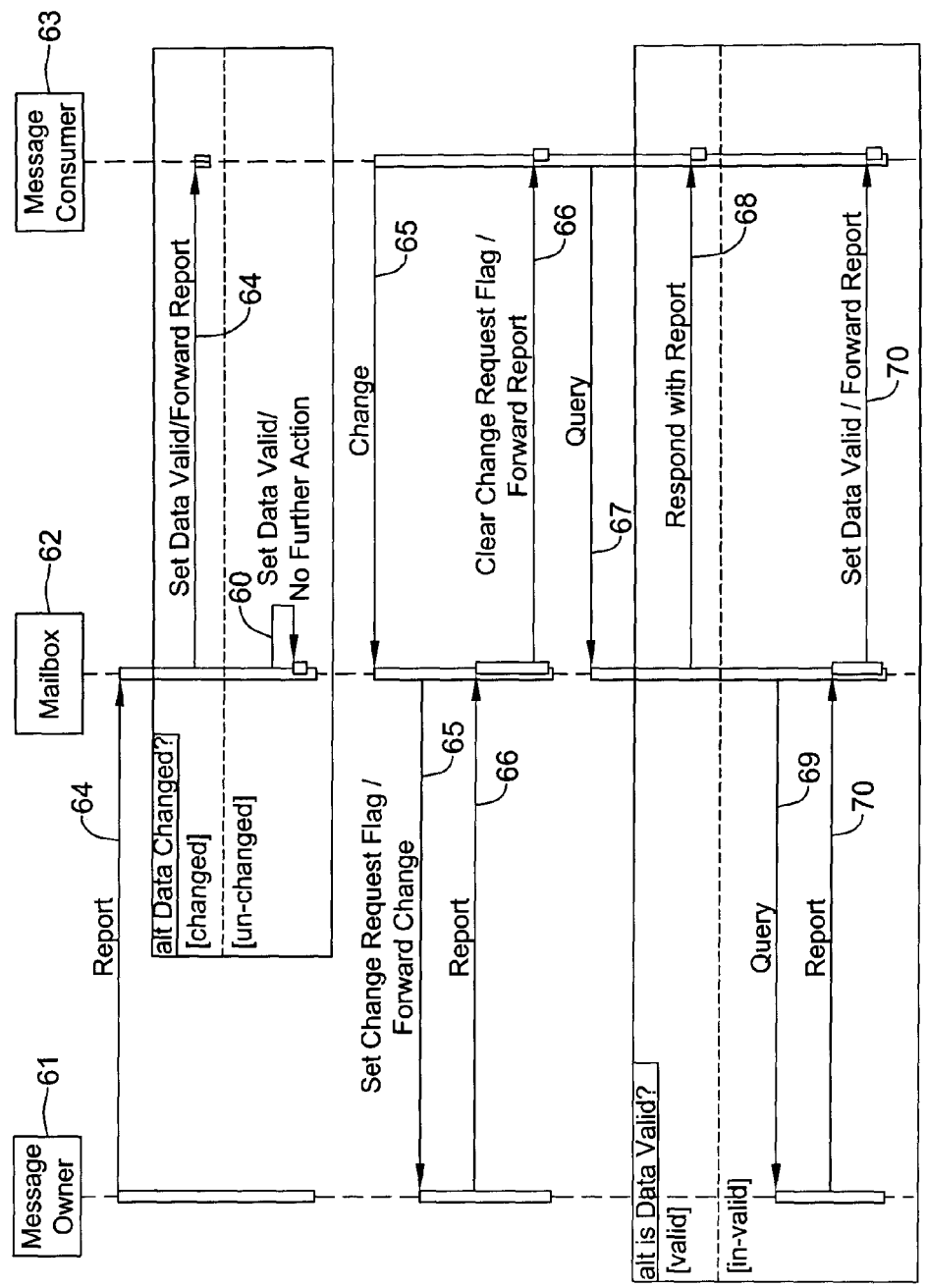
FIG. 4 is a diagram of a sequence for the mailbox mechanism.

FIG. 4 is a diagram of a message sequence of a mailbox at device 11. A report 64 may be sent by a message owner 61 to a mailbox 62. If data has changed in report 64 in comparison with data in a possible report already at the mailbox 62, then report 64 may be forwarded to a message consumer 63. If data has not changed in report 64 in comparison with data in a possible report already at mailbox 62, then report 64 is not necessarily forwarded to message consumer 64. An action may then be "set data valid/no further action" 60. A change 65 may be provided back by message consumer 63 to mailbox 62. Change 65 may be forwarded from mailbox 62 to message owner 61, with "set change request flag". A report 66 may be sent from message owner 61 to mailbox 62. Report 66 may be forwarded with "clear change request flag" to message consumer 63. A query 67 may be sent from message consumer 63 to mailbox 62 as to whether the data of the report 66 is valid. If the data is valid, then a response with a report 68 may be sent from mailbox 62 to message consumer 63. If the data is invalid, then a query 69 may be sent from mailbox 62 to message owner 61. A report 70 to mailbox 62 may be sent by message owner 61. Mailbox 62 may forward report 70 with "set data valid" to message consumer 63.

Figure 5:
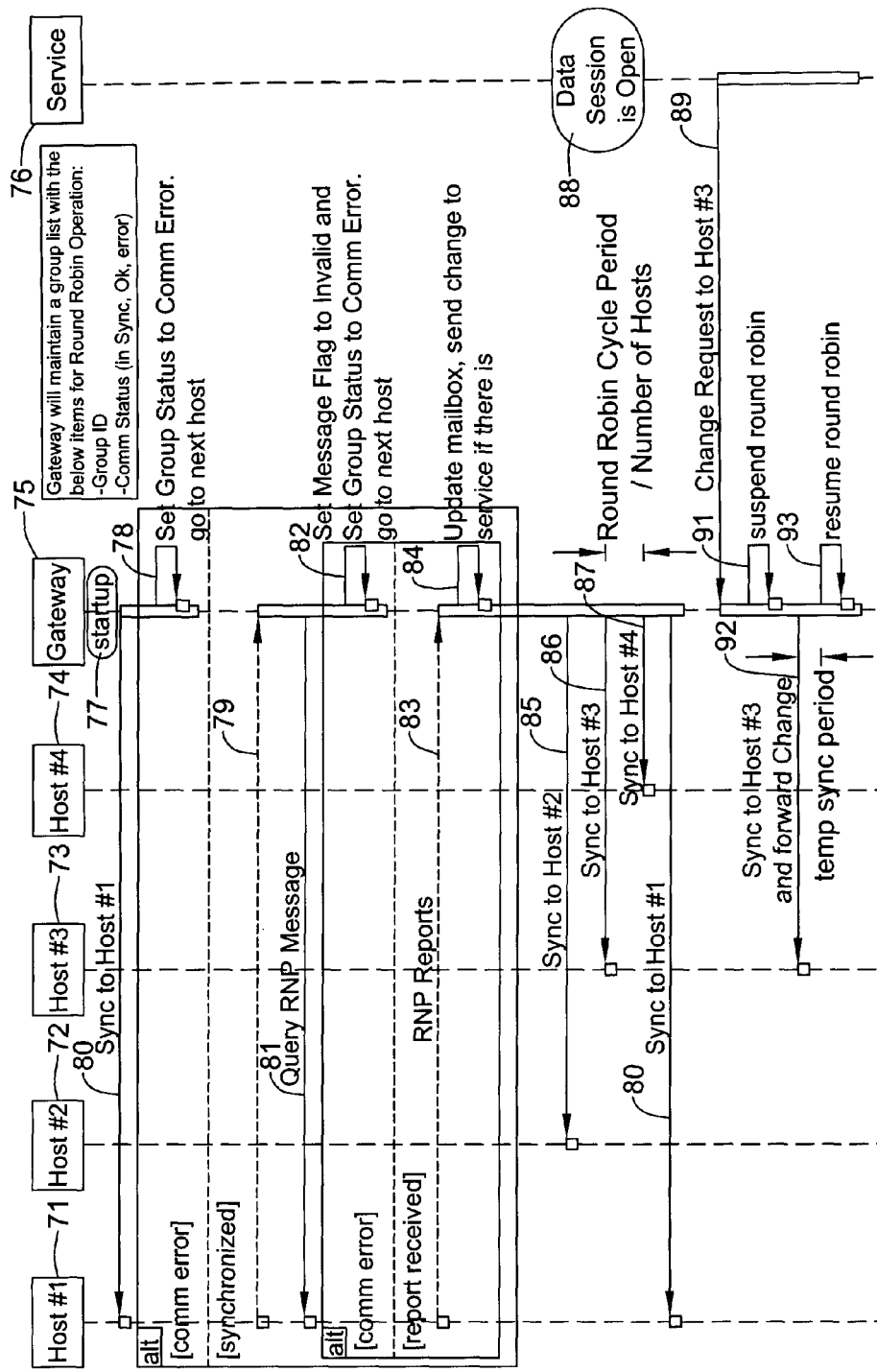
FIG. 5 is a diagram of a gateway and hosts.

FIG. 5 is a diagram of a gateway 75 and four hosts (#1, #2, #3, #4) 71, 72, 73, 74, respectively, to which gateway 75 may individually sync when communicating. Gateway 75 may maintain a group list of the hosts with items group ID, wireless apparatus revision and communication status (e.g., in sync, OK, error or so forth) for round robin operation. Also a service 76 may be provided.

At a startup 77, at an action 80, gateway 75 may sync to host 71. If there is a communication error, then group status may be set to comm. error, and gateway 75 may go to the next host at action 78. If there is a synchronization with host 71, then there may be a communication 79. Gateway 75 may send a query residential network protocol (RNP) message 81 to host 71. If there is a communication error, then a message flag may be set to invalid and group status be set to comm. error, and gateway 75 may go to the next host at action 82. If message 81 or report is received, then an RNP report 83 may be sent to gateway 75. Gateway 75 may update its mailbox and send a change to service 76, if there is one, at action 84.

Gateway 75 may next sync to host 72 at an action 85. Gateway 75 may proceed through actions and/or steps like those of 78, 79, 81, 82, 83 and 84 with respect to host 71. After host 72, gateway 75 may similarly proceed with hosts 73 and 74 with like actions and/or steps like those relative to hosts 71 and 72, including syncs 86 and 87, respectively. Gateway 75 may return to host 71 with a sync action 80. The sync-ing with hosts 71-74 may be performed in a round robin fashion. The time spent by gateway 75 with a host may be a round robin cycle period divided by the number of hosts.

The round robin cycle may be interrupted or suspended at an action 91 by service 76 wherein data session is open at item 88. There may be a change request to, for example, host 73 during the round robin cycle period, particularly if gateway 75 is not in synch with host 73, at an action 89. A sync to host 73 and a change may be forwarded to host 73 at an action 92 for a temporary sync period from actions 92 to 93. Upon completion of a communication from gateway 75 to host 73, round robin may be resumed with an action 93.

FIG. 6 is a diagram of a round robin process which may be applied relative to gateway 75 and hosts 71-74 relative to synchronous communications in FIG. 5. At a startup 95, a number (N) hosts, which gateway 75 is enrolled with, may be indicated at a symbol 96. If N>1, then an approach in symbol 97 may begin at initial 98. Normal scheduling at symbol 99 may be an action or step to be taken. The time or interval of time for gateway 75 to be in sync with a host may be, for example, 225 seconds as an interval. A total time to be spent with all of the hosts during one round robin cycle may for instance be 15 minutes. Thus, an interval may be the cycle divided by a number of hosts, which in an illustrative example could be four, resulting in a 225 second interval. The cycle time and the number of hosts may be different than those of the example provided herein. If an interrupt is required, then the sync to the specific host may be suspended as indicated at symbol 101. In a case of interrupt to round robin, a change to the other host may be received via a data session, and a query to the other host and mailbox may be invalid, as noted in symbol 102. Along indication 103, there may be a 75 second duration from a last change to the present host or a minimum time for a quick schedule left where an error code is sent to the data service. There may be a quick scheduling for unscheduled hosts at symbol 104. A power interrupt at indication 105 may go to symbol 101 for suspending the sync to the specific host at symbol 104. 75 seconds may be indicated for other unscheduled hosts at an action item 106. On an indication 107 to symbol 99, for normal scheduling, all unscheduled hosts for the present round may have been scheduled.

In a case at symbol 108 where N<=1, round robin may be deemed inactive. N>1 may mean a signal from symbol 108 to round robin active at symbol 97, and N=1 may mean a signal from symbol 97 to round robin inactive at symbol 108. An exception in FIG. 6, according to symbol 109 is relative to a service change request coming but not responded to yet, and there may be another query from the service and the mailbox has not valid data.

Figure 7:
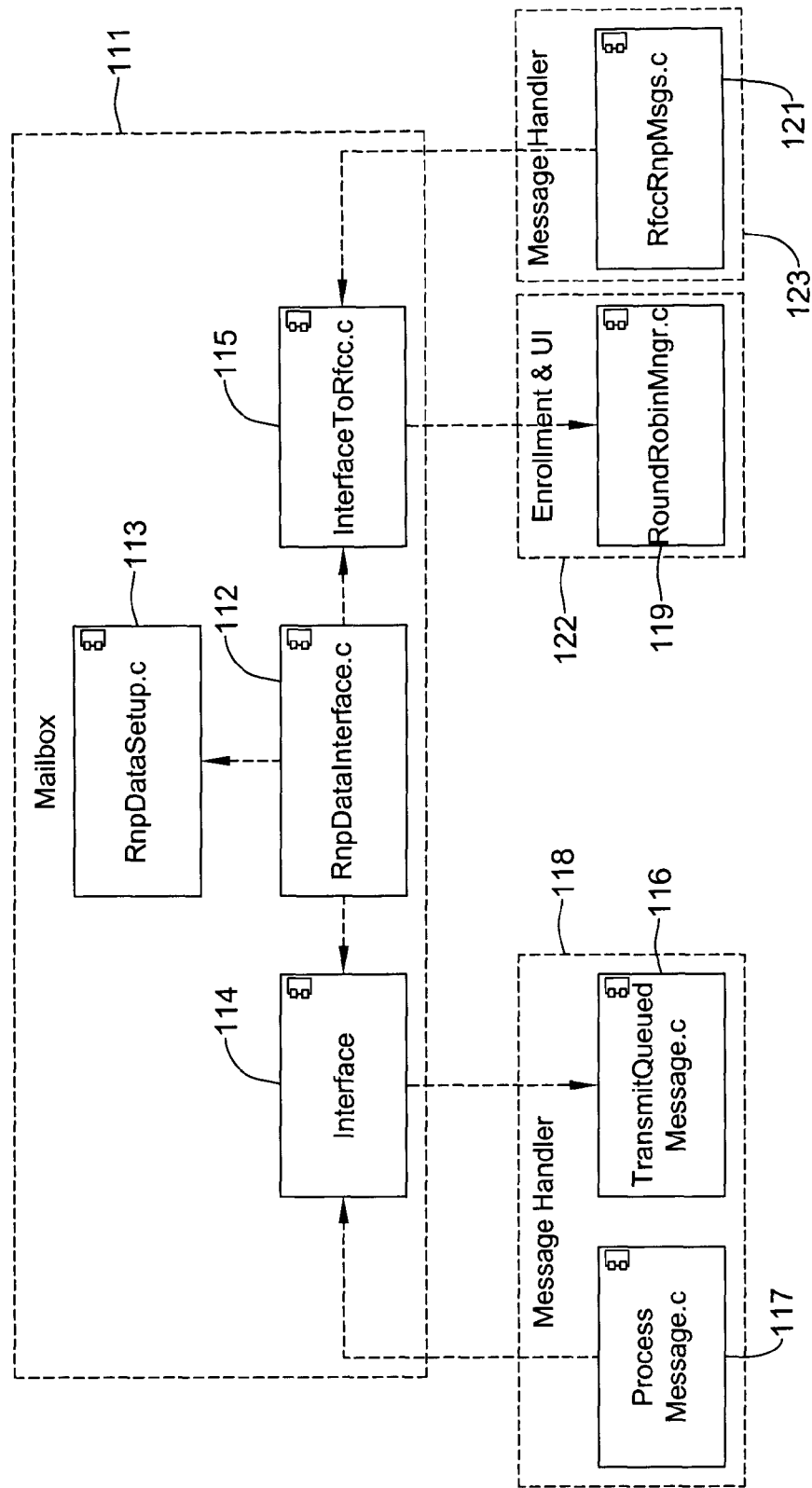
FIG. 7 is a diagram of a mailbox setup.

FIG. 7 is a diagram of a mailbox setup. A mailbox 111 may have an RNP data interface at symbol 112 with output connections to RNP data setup at symbol 113, an interface to a server infrastructure (or server) at symbol 114 and to interface to RFCC at symbol 115. The interface to the server infrastructure at symbol 114 may have an output connection to transmit a queued transport protocol message at symbol 116 and an input connection from a process transport protocol message at symbol 117. Symbols 116 and 117 may be incorporated by a transport protocol message handler at symbol 118.

Interface to RFCC at symbol 115 may have an output connection to round robin mngr at symbol 119 and an input connection from RFCC RNP msgs at symbol 121. Symbol 119 may be incorporated by RF link enrollment and a user interface at symbol 122. Symbol 121 may be incorporated by an RF link message handler at symbol 123.

Figure 8:
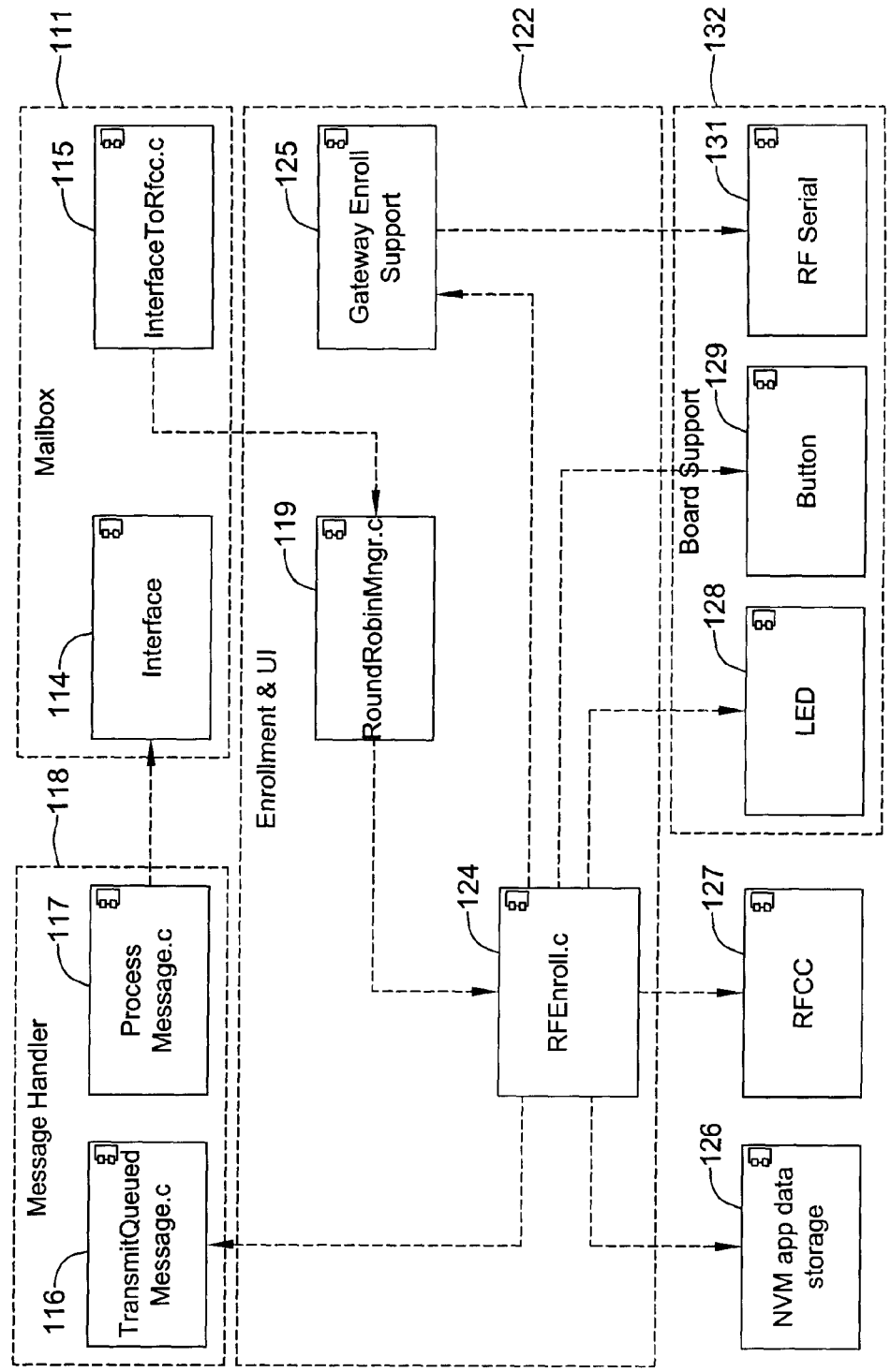
FIG. 8 is a diagram showing some details of an RF region enrollment and user interface.

FIG. 8 is a diagram showing some details of the RF link enrollment and user interface in symbol 122 of FIG. 7. Round robin mngr at symbol 119 may have an output connection to an RF enroll at symbol 124 which is within symbol 122. RF enroll of symbol 124 may have an output connection to a gateway enroll support at symbol 125 within symbol 122. RF enroll at symbol 124 may also have output connections to transmit a queued transport protocol message at symbol 116 of the message handler at symbol 118, NVM app data storage at symbol 126, RFCC at symbol 127, an LED at symbol 128 and a button at symbol 129. Gateway enroll support at symbol 125 may have an output connection to an RF serial at symbol 131. Board support at symbol 132 may incorporate an LED at symbol 128, the button at symbol 129 and RF serial at symbol 131. Process the transport protocol message at symbol 117 may have an output connection to symbol 114 having interface to a server infrastructure of mailbox 111. An interface to RFCC at symbol 115 of mailbox 111 may have an output connection to round robin mngr at symbol 119.

Figure 9:
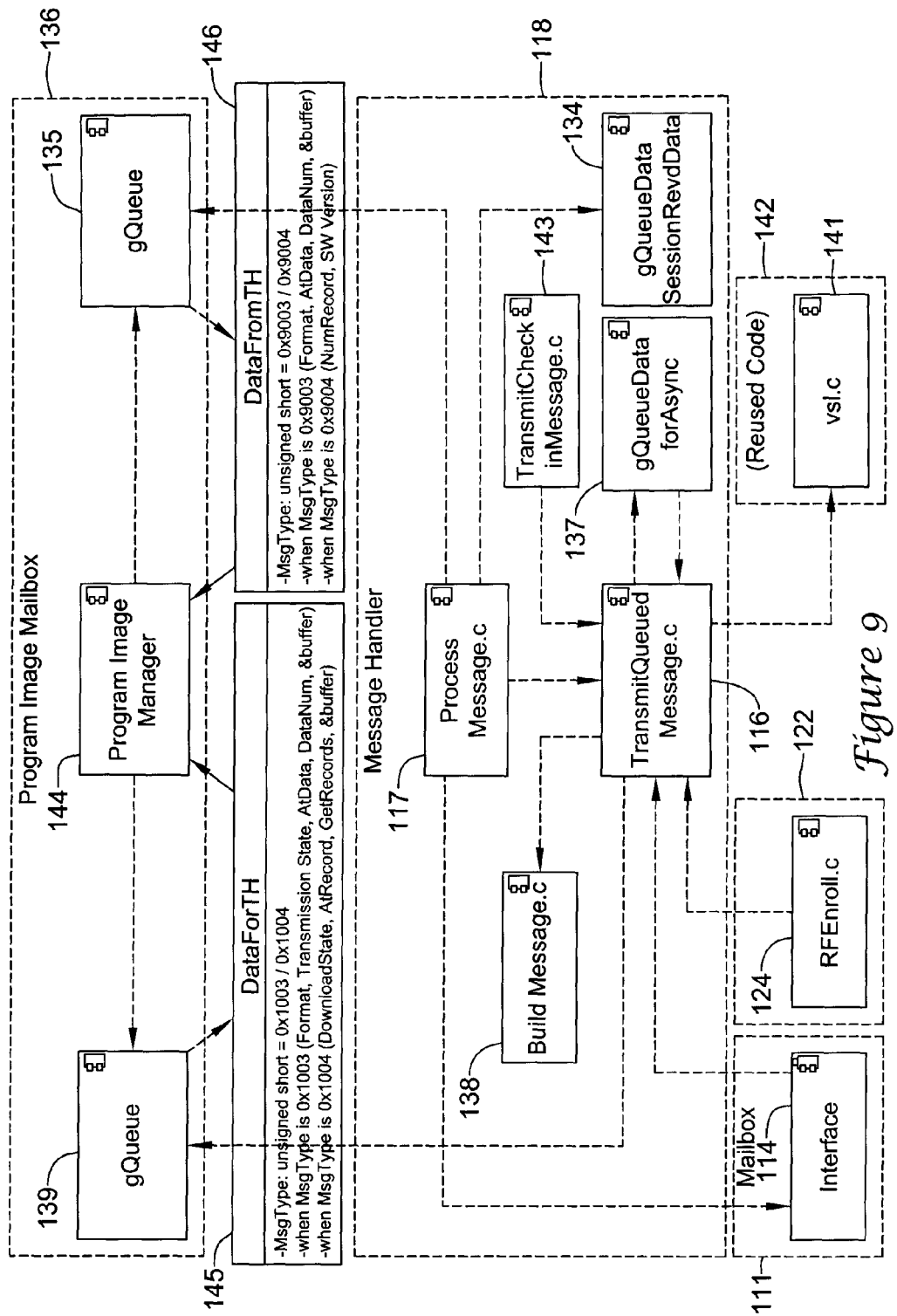
FIG. 9 is a diagram of a message handler.

FIG. 9 is a diagram of a transport protocol message handler at symbol 118 having additional details relative to the transport protocol message handler at symbol 118 of FIG. 8. Process the transport protocol message at symbol 117 may have an output connection to transmit the queued transport protocol message at symbol 116, an output connection to interface to a server infrastructure at symbol 114 of mailbox 111, an output connection to queue data session rev'd transport protocol data at symbol 134, and an output connection to queue from the transport protocol at symbol 135 incorporated by a program image manager at symbol 136.

Transmit queued the transport protocol message at symbol 116 may have an output connection to queue data for the transport protocol async at symbol 137, an output connection to build a transport protocol message at symbol 138, an output connection to queue for the transport protocol at symbol 139, and an output connection to v st at symbol 141 which is incorporated by server infrastructure (reused code) at symbol 142.

Transmit queued transport protocol message at symbol 116 may have an input connection from process transport protocol message at symbol 117, an input connection from queue data for transport protocol async at symbol 137, an input connection from interface to a server infrastructure at symbol 114, an input connection from RF enroll at symbol 124 within an RF link at symbol 122, and an input connection from a transmit transport protocol checkin message at symbol 143.

A program image manager of a symbol 144 may be incorporated, along with symbols 135 and 139, by symbol 136 for the program image manager, and may have an output connection to queue for a transport protocol at symbol 139 and an output connection to a queue from the transport protocol at symbol 135.

Data for a transport protocol at symbol 145 may have an input connection from queue for a transport protocol at symbol 139 and an output connection to program image manager at symbol 144. Data from a transport protocol at symbol 146 may have an input connection from queue from a transport protocol at symbol 135 and an output connection to program image manager at symbol 144.

Components that represent the data entity-queue may incorporate g queue data session rev'd transport protocol data at symbol 134, g queue from a transport protocol at symbol 135, g queue data for a transport protocol async at symbol 137 and g data for transport protocol at symbol 139.

Figure 10:
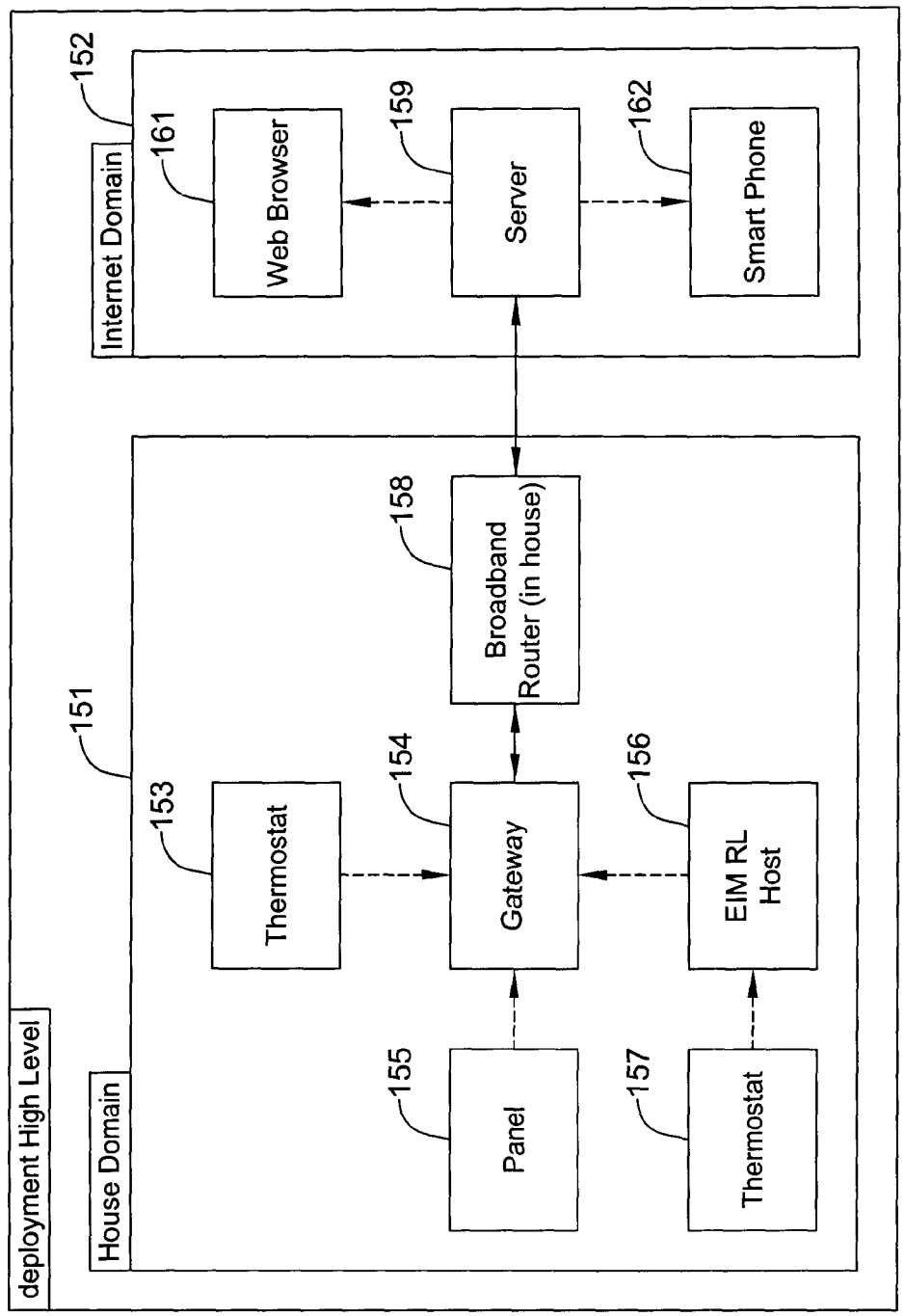
FIG. 10 is a diagram of a house domain and an internet domain.

FIG. 10 is a diagram of a house domain at symbol 151 and an internet domain at symbol 152. The diagram may display the gateway in its operational environment where data are collected from devices in a location (e.g., a building) and sent to an internet-connected client. Internet clients may incorporate web browsers, smart phones, and so forth. The gateway domain of operation may be the location where it is installed. Within the location, the different devices that the gateway can connect to may be RF link enabled devices.

The server infrastructure may collect data from the gateway using an internet link. The data may be kept in a gateway owner's account and might be accessed using internet clients.

In the domain at symbol 151, a thermostat at symbol 153 may have an output connection to a gateway at a symbol 154. A zoning device panel at symbol 155 may have an output connection to the gateway at symbol 154. An EIM RF link host at symbol 156 may have an output connection to the gateway. Devices at symbol 157, such as an RF enabled thermostat, may have an output connection to the EIM RF link host at symbol 156. The gateway at symbol 154 may have a two-way connection with an in-house broadband router at symbol 158. There may be a two-way connection between the router at symbol 158 and a server infrastructure at symbol 159 within the internet domain at symbol 152. The server may have an output connection to a web browser at symbol 161 and an output connection to a smart phone at symbol 162.

Figure 11:
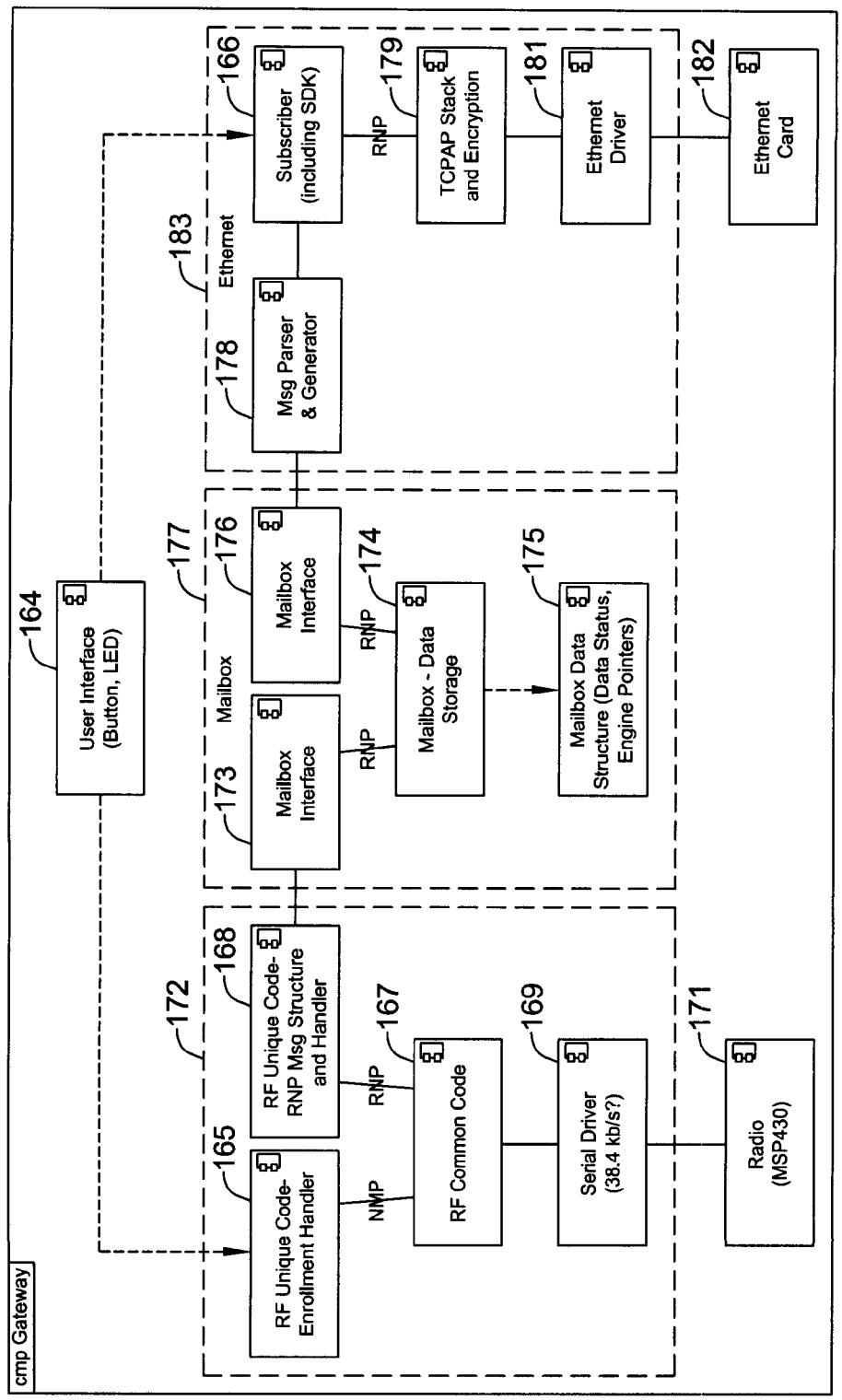
FIG. 11 is a diagram of a gateway structure.

FIG. 11 is a diagram of a gateway structure. Major modules of the structure may incorporate a mailbox, an ethernet, RF link and a user interface. Mailbox components may incorporate data storage which keeps in a memory a data structure (i.e., RNP messages). The mailbox module may keep a message class instance in a volatile memory. Only updates of the message class should be sent to a server. By doing so, the gateway may stay efficient in usage of the server and not necessarily send duplicate messages. The mailbox may perform a communication link between the components in the gateway. Mailbox components may incorporate two interfaces to the ethernet and the RF link modules so that the mailbox can stay decoupled and reusable.

An ethernet interface block may incorporate the following noted modules. A message module and a server infrastructure module may be dedicated to the transmission of network packets to the server. A server infrastructure subscriber may use a TCP/IP stack and encryption module to package the data before sending the packet using an ethernet driver.

RF link application components may be modules for enrollment and RNP message structure. These modules may be application specific and use an RF common code API module. The modules may ensure that the gateway is reliable in the RF link network. The common code may interface with the serial driver interface to communicate with the RF toolkit in the RF link radio module.

A software application may also incorporate a module to interact with a user. An input may be performed using a button on a device. Software may implement an RF link enrollment function. Three LED's may give software feature status indications to the user.

A user interface, having button and one or more LED's, at symbol 164 may have an output connection to an RF unique code enrollment handler at symbol 165 and an output connection to a server subscriber, including a server SDK, at symbol 166. The RF unique code enrollment handler at symbol 165 may have an NMP connection with RF common code at symbol 167. An RF code RNP message structure and handler at symbol 168 may have an RNP connection with the RF common code at symbol 167. The RF common code may have a connection with a serial driver at symbol 169. The serial driver may operate at an example 38.4 Kb/s, or at other frequencies. The serial driver may have a connection to an RF link radio 171. The items at symbols 165 and 167-169 may be incorporated in an RF link module at symbol 172.

The RF unique code RNP message structure and handler at symbol 168 may have an RNP connection to a mailbox interface to an RF link at symbol 173. The mailbox interface to an RF link at symbol 173 may have an RNP connection with mailbox data storage at symbol 174. A mailbox data structure (e.g., data status, engine pointers, and so forth) may be noted. The mailbox data storage at symbol 174 may have an output connection to the mailbox structure at symbol 175. Mailbox data storage at symbol 174 may have an RNP connection to a mailbox interface to a server infrastructure at symbol 176. The items at symbols 173-176 may be incorporated in a mailbox at symbol 177.

The mailbox interface to the server infrastructure at symbol 176 may have an RNP connection with a message parser and generator at symbol 178. The message parser and generator may have a connection with the server infrastructure subscriber (including server infrastructure SDK) at symbol 166. The alarm subscriber at symbol 166 may have an RNP connection with a TCP/IP stack and encryption at symbol 179, which may have a connection with an ethernet driver at symbol 181. The ethernet driver may have a connection with an ethernet card at symbol 182. The items at symbols 166, 178, 179 and 181 may be incorporated in the ethernet module at symbol 183.

Figure 12:
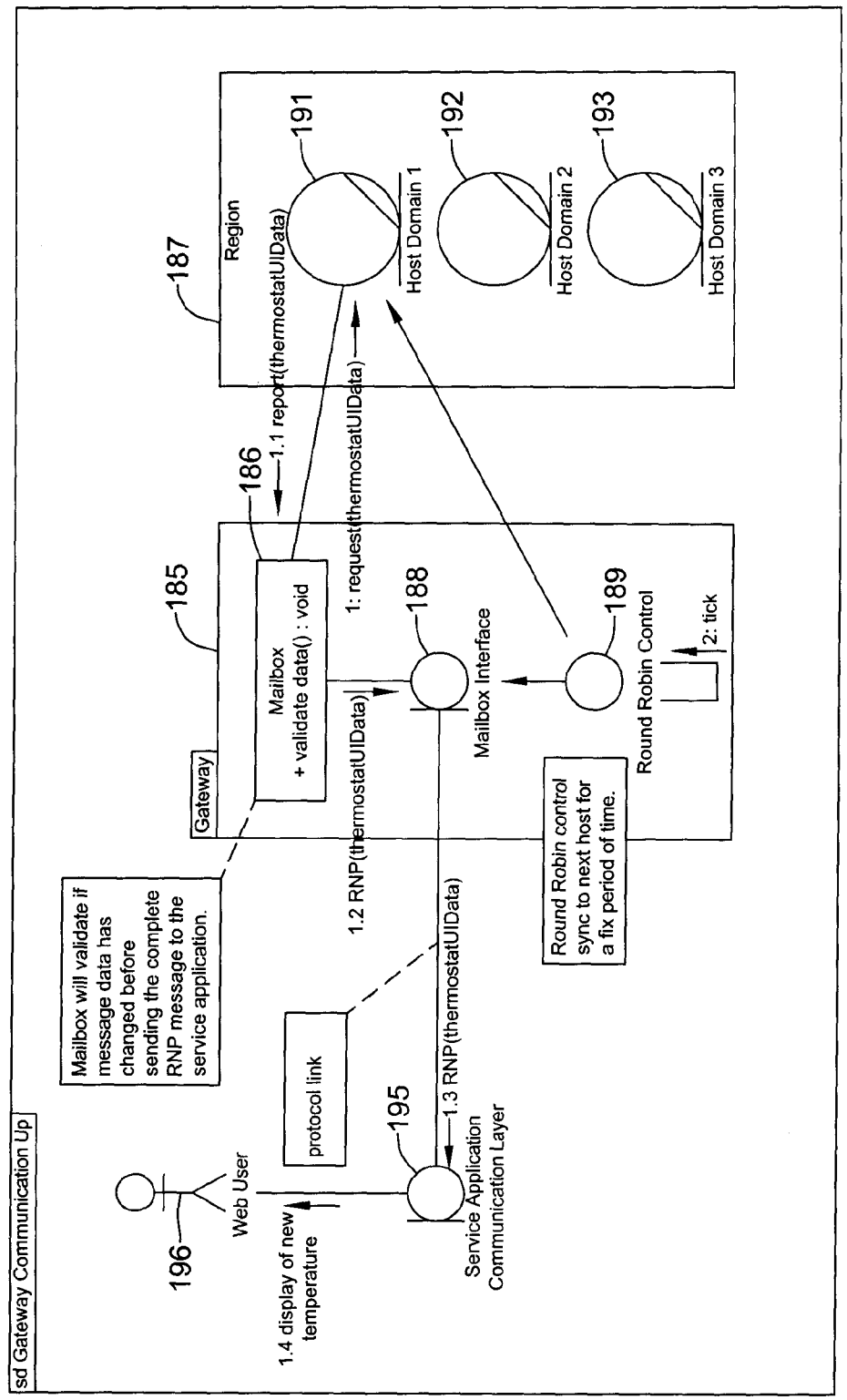
FIG. 12 is a diagram of transmission of thermostat user interface updates from a host domain.
Figure 13:
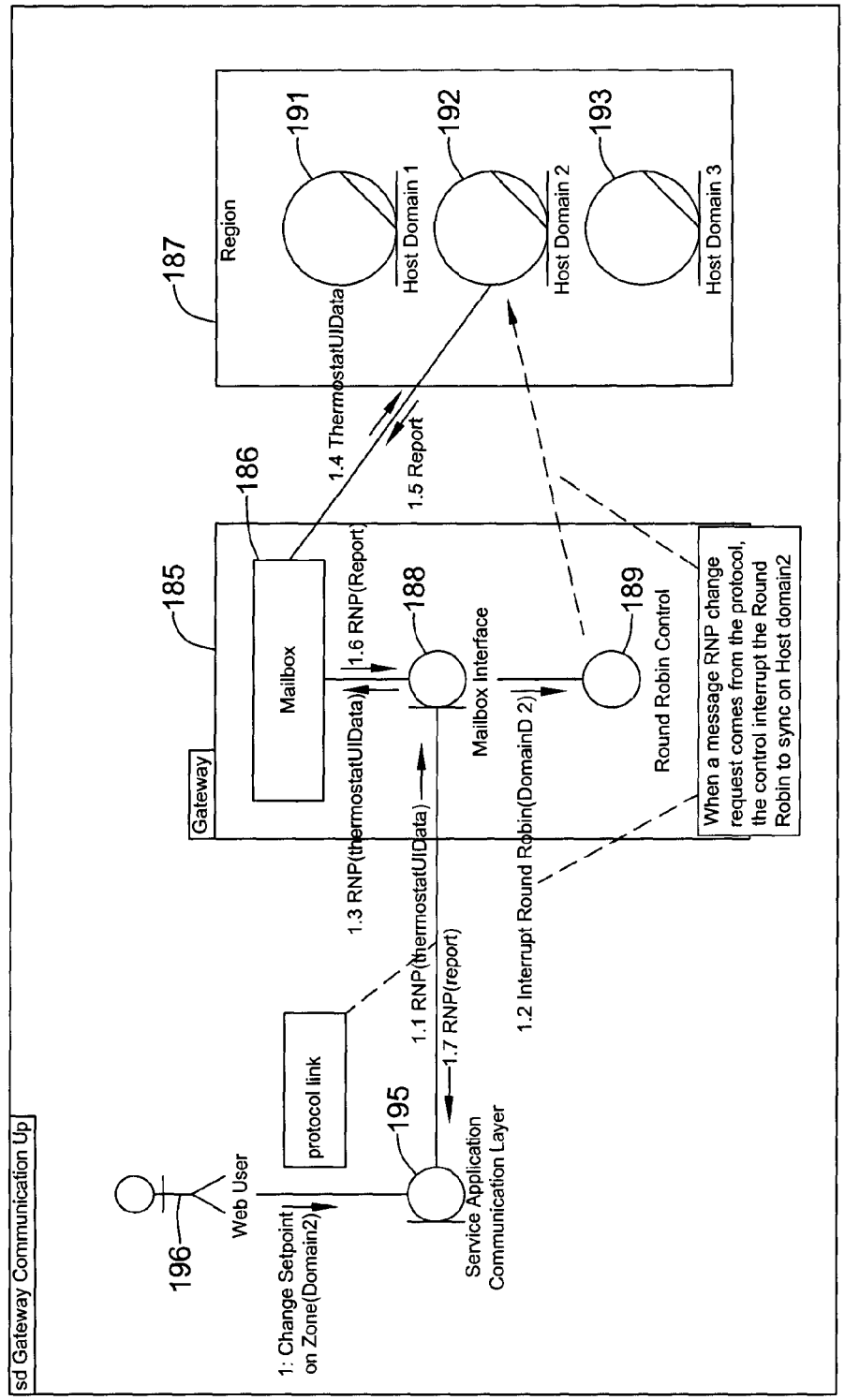
FIG. 13 is a diagram showing a way that a user on the web can change a thermostat setpoint and have a message sent to the gateway.

FIGS. 12 and 13 are diagrams of gateway communication approaches. The gateway may be an RF link multi-system client which can be connected to up to four hosts in the present example. The gateway may be connected to more or less than four hosts. The gateway may synchronize and communicate with one host at a time to receive and send messages. The approach here may be a round robin. The gateway may cycle through each host for a fixed period of time. A round robin may be interrupted when a change request is sent to a specific device linked to a host.

Messages may be sent by a service application using transport protocol packets. Messages may be received by the mailbox interface, transformed and set on an RF link region.

The mailbox may keep a copy of virtually all messages sent by RF link devices and may send only message updates to the service application when data are modified.

The diagram of FIG. 12 displays a transmission of thermostat user interface updates from a host domain 1. A message may be communicated up to a web. The diagram of FIG. 13 shows that a user on the web may change a thermostat setpoint and have a transport protocol message sent to the gateway. The round robin process may be interrupted to be synchronous with the correct host. The gateway may send the message to a targeted device (i.e., messages 1.1 to 1.4). The thermostat may update the setpoint and return a thermostat user interface data report to the service (i.e., messages 1.5 to 1.7).

FIG. 12 is a diagram of a gateway communication up approach. A gateway 185 may have a mailbox 186. A data request of a thermostat user interface may go to a host domain 191 of an RF link region 187 if the host domain 191 is in sync according to gateway 185. A report of thermostat data for the user interface may go from the host domain 191 to mailbox 186. Mailbox 186 may validate if message data has changed before sending the complete RNP to the service application. The RNP (thermostat data for the user interface) may proceed from mailbox 186 via mailbox interface 188 to with a transport protocol link to service application communication layer 195. A display of a new temperature may be provided to a web user 196. A round robin control 189 may sync to the next host domain 192 for a fixed period of time, and redo the data process as done for host domain 191, and again for host domain 193, and so on.

FIG. 13 is a diagram of a gateway communication down approach. A web user 196 may change a setpoint on a zone, host domain 192. The change may go to a service application communication layer 195. The change may go with a transport protocol link as RNP thermostatic data to a mail box interface 188 and then to mailbox 186 of gateway 185. Also, from interface 188, an interrupt round robin host 192 signal may go to round robin control 189. When a message RNP change request comes from the transport protocol, the control may interrupt the round robin to sync on host 192.

From mailbox 186, the change as thermostat user interface data may go to the host domain 192. An RNP report may be returned from host domain 192 to mailbox 186. The RNP report may proceed from mailbox 186 via mailbox interface 188 with a transport protocol link to the service application layer 195.

Figure 14:
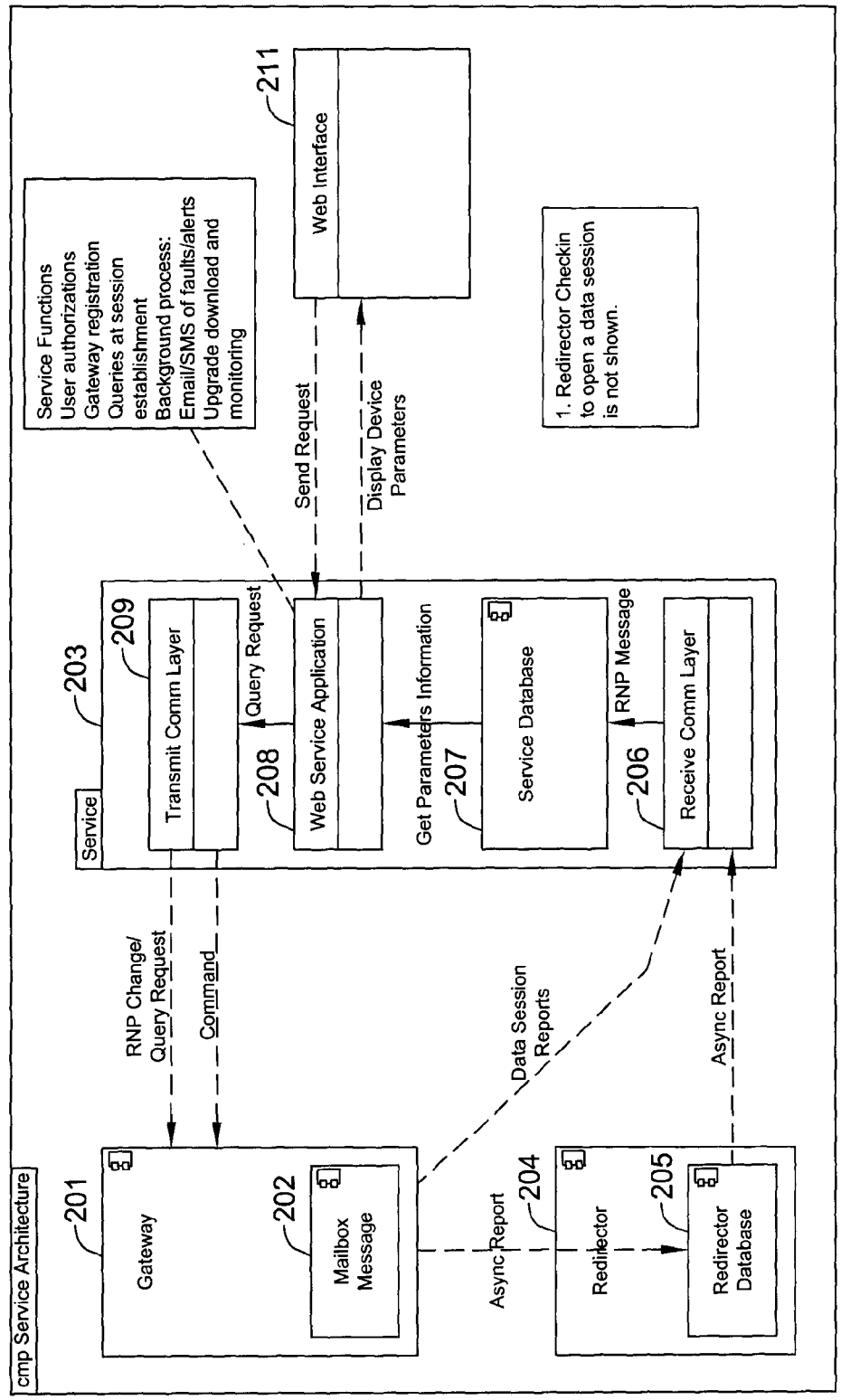
FIG. 14 is a diagram of a service application structure or architecture.

FIG. 14 is a diagram of a service application structure or architecture. A service application may incorporate a database, a web application and communication layers. A web module may interact with the web application to display information and receive action from button events. The communication layers may be instanced in the service application when user activity opens a data session on a web interface. A data session may be opened between the gateway and the service application using a checkin process. Virtually all messages may be sent through the data session during a user session.

A database may be used when there is no data session between a gateway and the service application. A synchronous message may be sent in this case. The messages may ensure that RF link reports are captured by the service application much of the time.

In FIG. 14, a gateway 201 may incorporate a mailbox message 202. Data session reports may flow from gateway 201 to a receive communication layer 206 of a service module 203. An async report may flow from gateway 201 to a redirector database 205 of a redirector 204. A redirector checkin may be done to open a data session. The async report may flow from database 205 to the receive communication layer 206. An RNP message may flow from layer 206 to a service database 207 of service module 203. Parameter information may be obtained and provided to a web service application 208 of service module 203. A request may be sent from a web interface 211 to the web service application 208. In response, display device parameters may go to the web interface 211.

Service functions of web service application 208 may incorporate user authorizations, gateway registration, and queries at a session establishment. A background process of application 208 may incorporate email, SMS of faults/alerts, upgrade downloads and monitoring, and so forth.

A query request proceed from web service application 208 to a transmit communication layer 209 of service module 203. An RNP change/query request and a transport protocol command may then flow to gateway 201.

Figure 15:
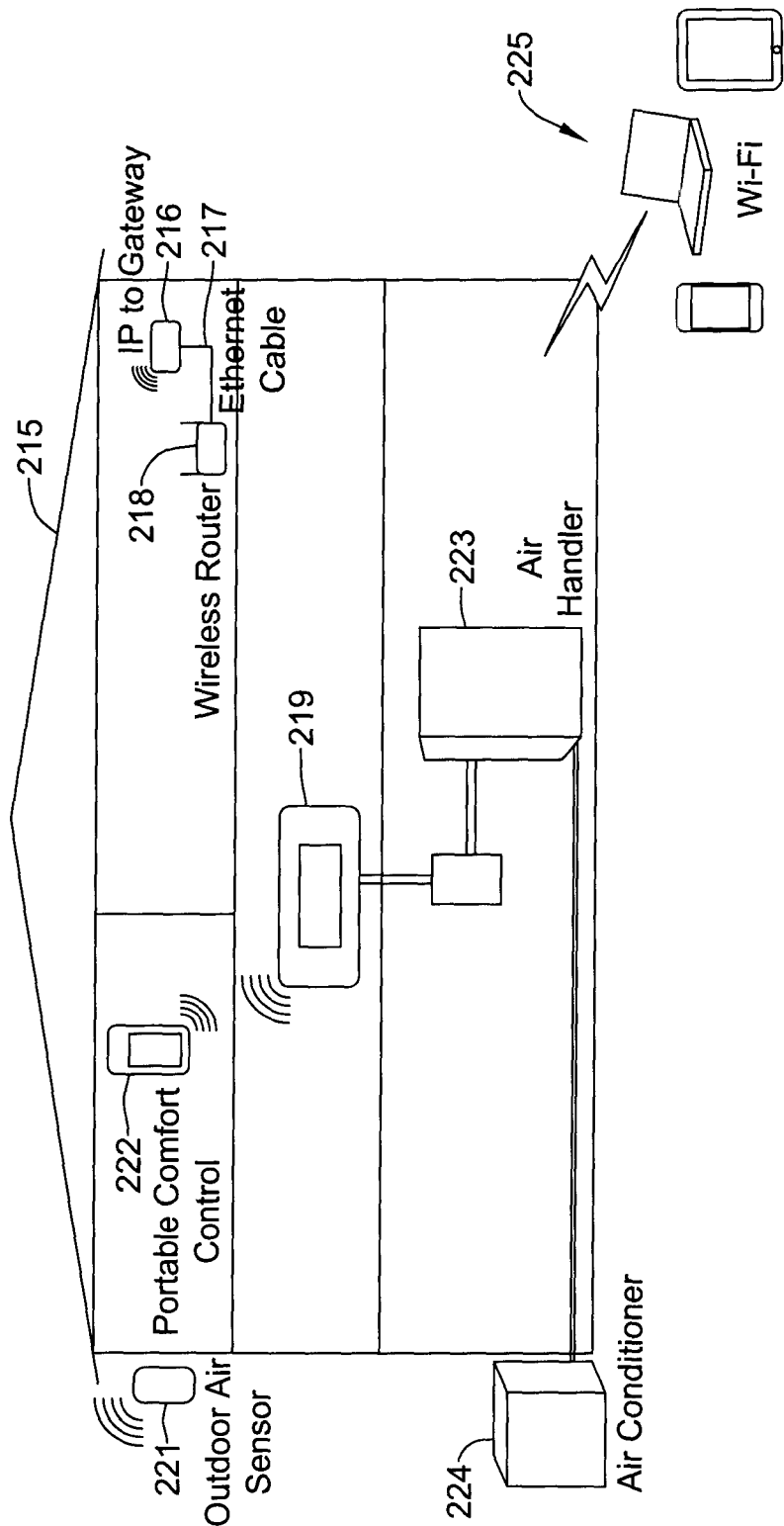
FIG. 15 is a diagram of a facility having wireless connections between the gateway device and hosts.

FIG. 15 is a diagram of a facility 215 having an IP link to an RF link gateway 216. Gateway 216 may communicate wirelessly to an RF link host such as a thermostat 219. A wireless router 218 may be connected to RF link gateway 216 with an ethernet cable 217. Wireless control may be achieved via router 218, ethernet cable 217 and RF link gateway 216. Thermostat 219 may receive control signals and provide information signals to a gateway 216. Control may also be via items 225 such as, for example, a laptop, a phone, a WiFi pad, or other items, and wireless control through internet router 218, cable 217 and gateway 216. Outdoor air sensor 221 may provide data to thermostat 219, and portable comfort control 222 may operate thermostat 219. Thermostat 219 may have control of air handler 223 and air conditioner 224.

Figure 16:
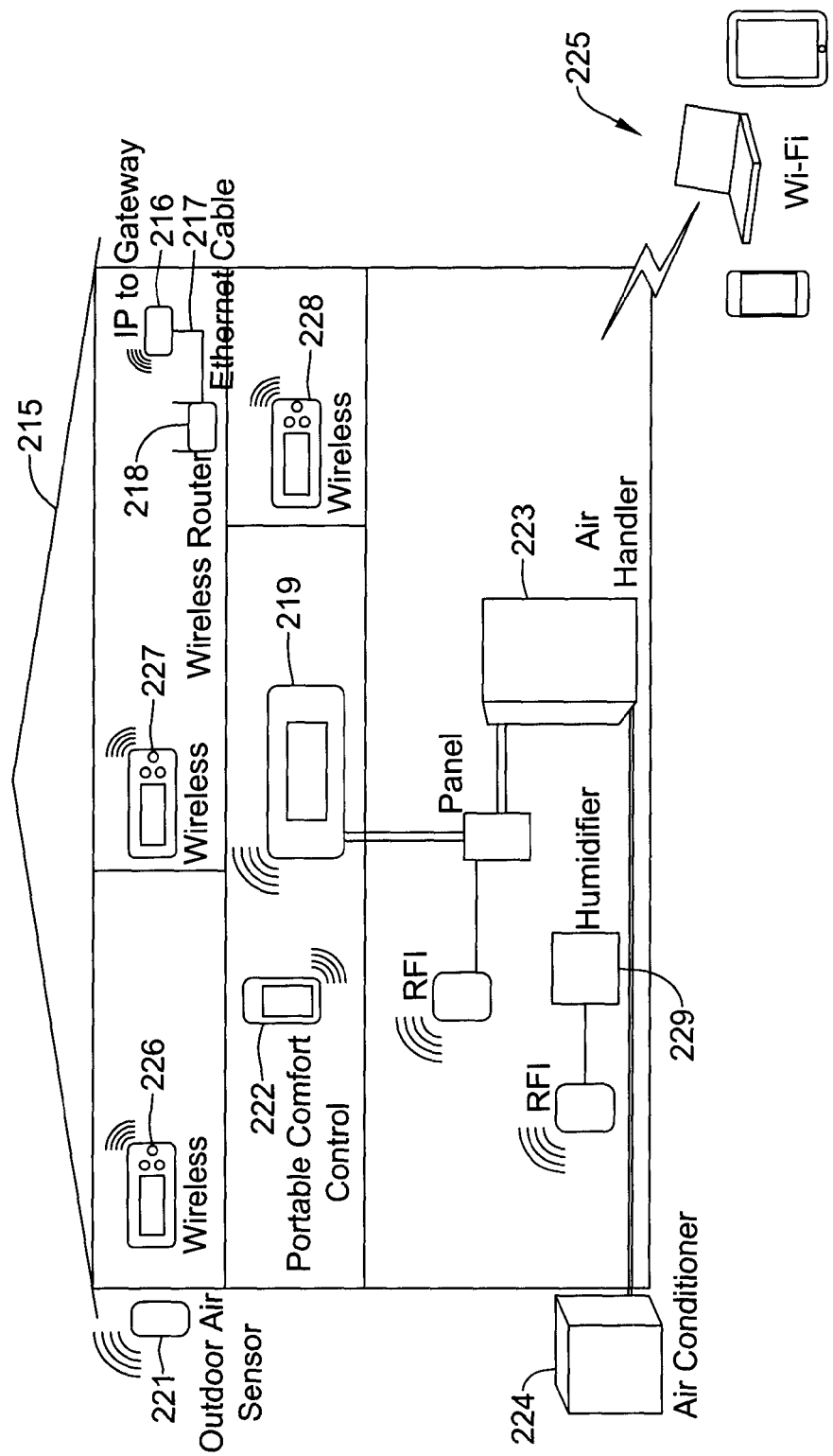
FIG. 16 is a diagram of a gateway in a house wirelessly connected to hosts in several zones.

Gateway 216 may communicate wirelessly with various hosts in facility or home 215. A web site may show, for instance, four zones separately in FIG. 16. Three of the zones may be ones with thermostats 226, 227 and 228, respectively. A fourth zone may one with a thermostat 219 wired to a zoning device with an RF link connected humidifier 229. Information from thermostats 226-228 and 219 may then be wirelessly communicated to hosts by gateway 216.

Figure 17:
FIG. 17 is a diagram of a table that reveals command descriptions.

Transport protocol service should implement commands in a command message to operate and manage a gateway remotely. The commands may modify the behavior of the device or start process action. No permanent items are necessarily kept. Table 326 of FIG. 17 reveals command descriptions.

There may be different responses from a gateway. A header may be used for the response/reports. Table 327 of FIG. 18 shows a response/report having a header showing fields, bits, name and description.

Table 328 of FIG. 19 may be an example of a device information response. A message structure may follow the header. The report structure may be sent automatically from a gateway or after a request from the service. Such message would be sent only for the RF link type of device.

Figure 20:
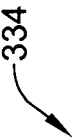
FIG. 20 is a diagram of a table showing a structure of a management command message.

FIG. 20 is a diagram of a table 334 showing a structure of a management command message which may reveal the basic approach for sending commands to a device and performing management.

Table 341 of FIG. 21 reveals a structure for encapsulating RF link information to be sent to a transport protocol service. The structure may be repeated for each RNP (residential network protocol) message in a data payload.

The service application should have a command to reset a particular gateway device. A device reset may reset CPUs. When the device is reset, the service may log an event.

The service application should have a command to request a particular gateway to stop sending transactions to the service. Sending checkin packets may be resumed after a local reset.

The gateway should send a system configuration message at a session establishment to inform the service of the system time and of the host status and the domain ID. The message may be sent without a service request by the gateway as a report.

Asynchronous messaging communication may be a communication approach for a gateway to inform the service using one message of information. The message cannot necessarily be sent from the service to one gateway.

An asynchronous packet may be sent by the gateway to a redirector server n a specific port to make the payload information available for the service application. It may be a one-way message. The service cannot necessarily send an asynchronous message to the gateway.

The gateway should use the transport protocol, encapsulated in an asynchronous structure to send a packet to the transport protocol service application. The packet may be received by the redirector server and be provided to the service application, using a database query. When there is not a data session open, faults and errors may be sent using an asynchronous message.

Figure 22A:
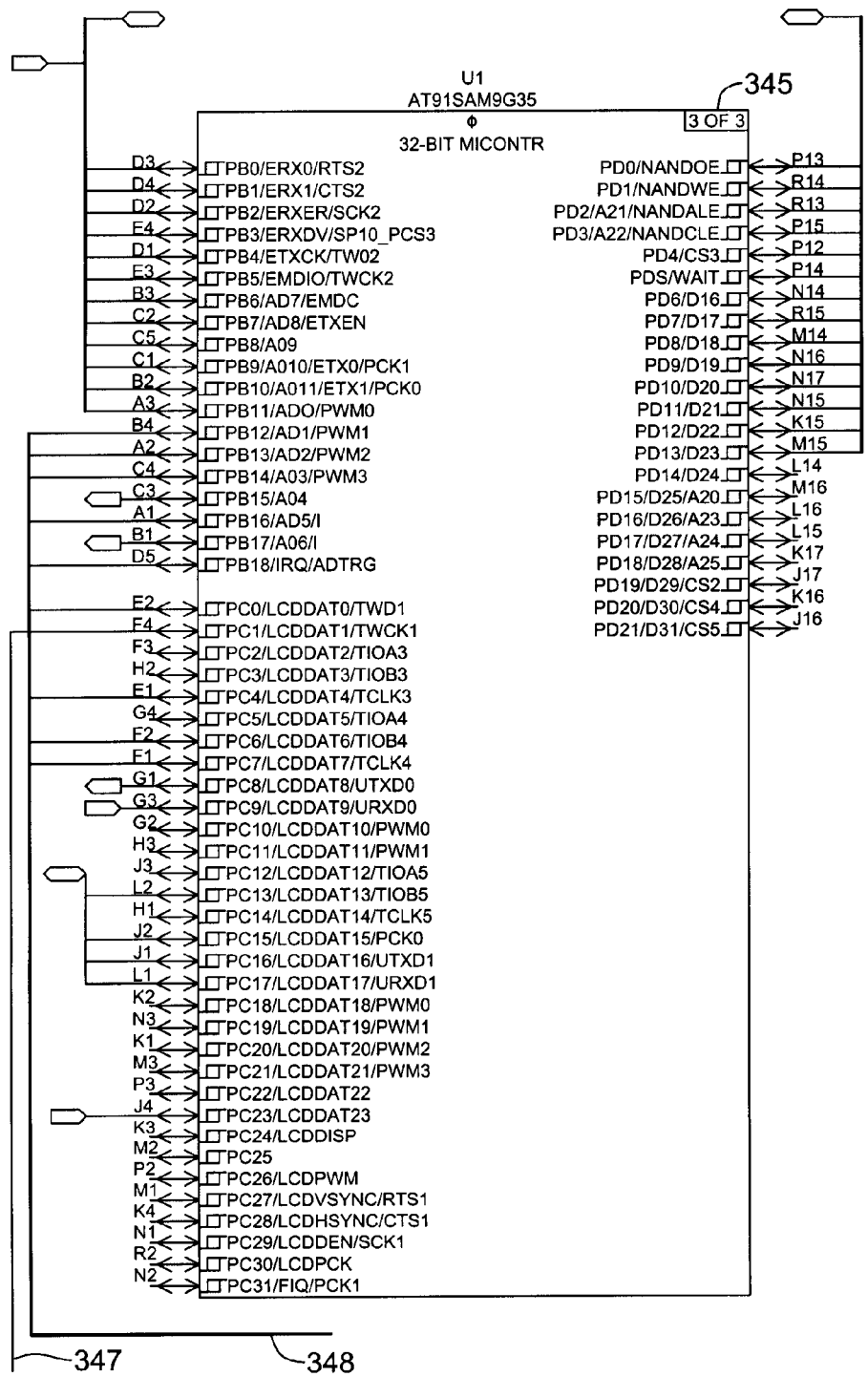
FIGS. 22a-22r are diagrams of schematics for hardware in the present system.
Figure 22B:
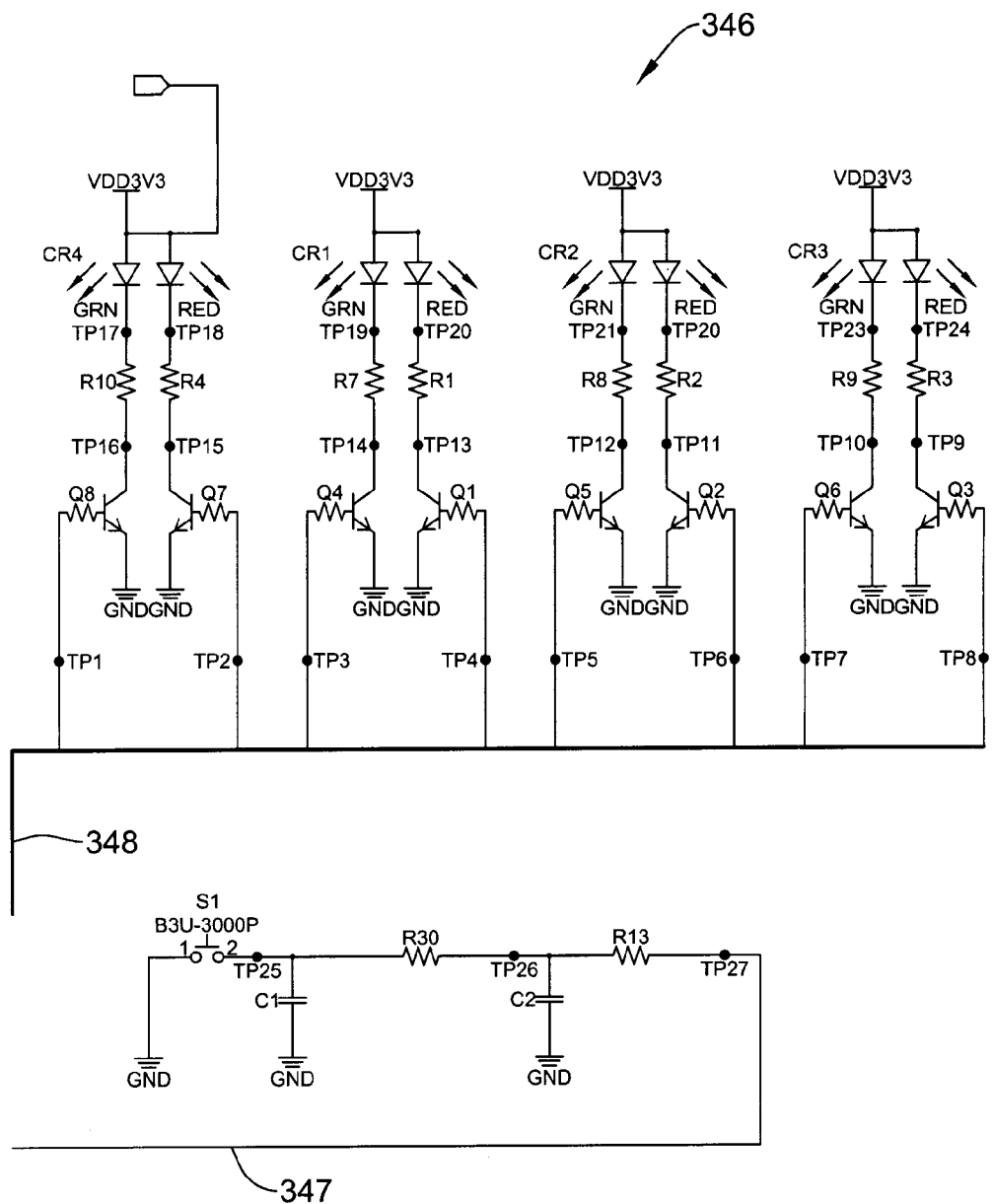
Figure 22C:
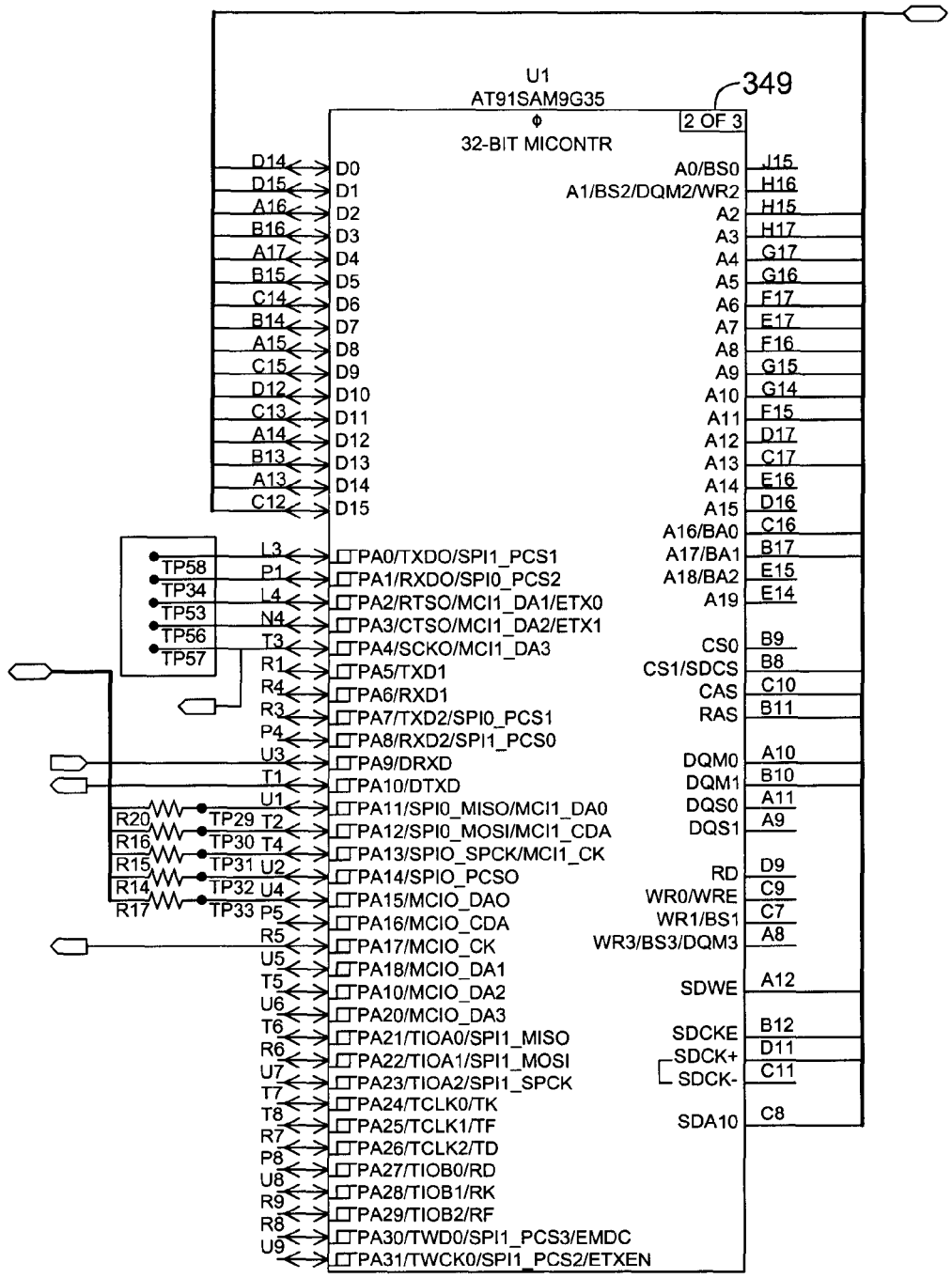
Figure 22E:
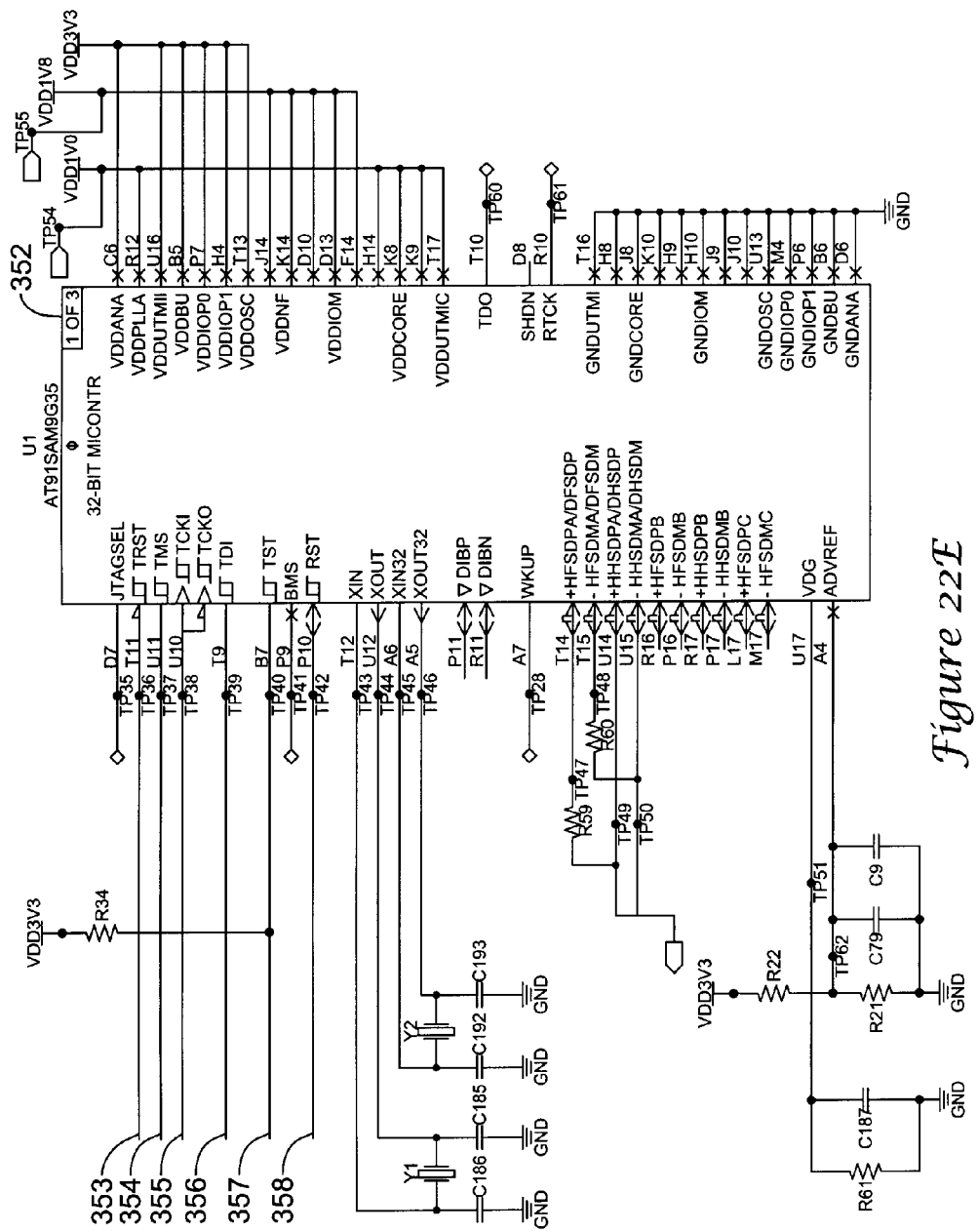
Figure 22F:
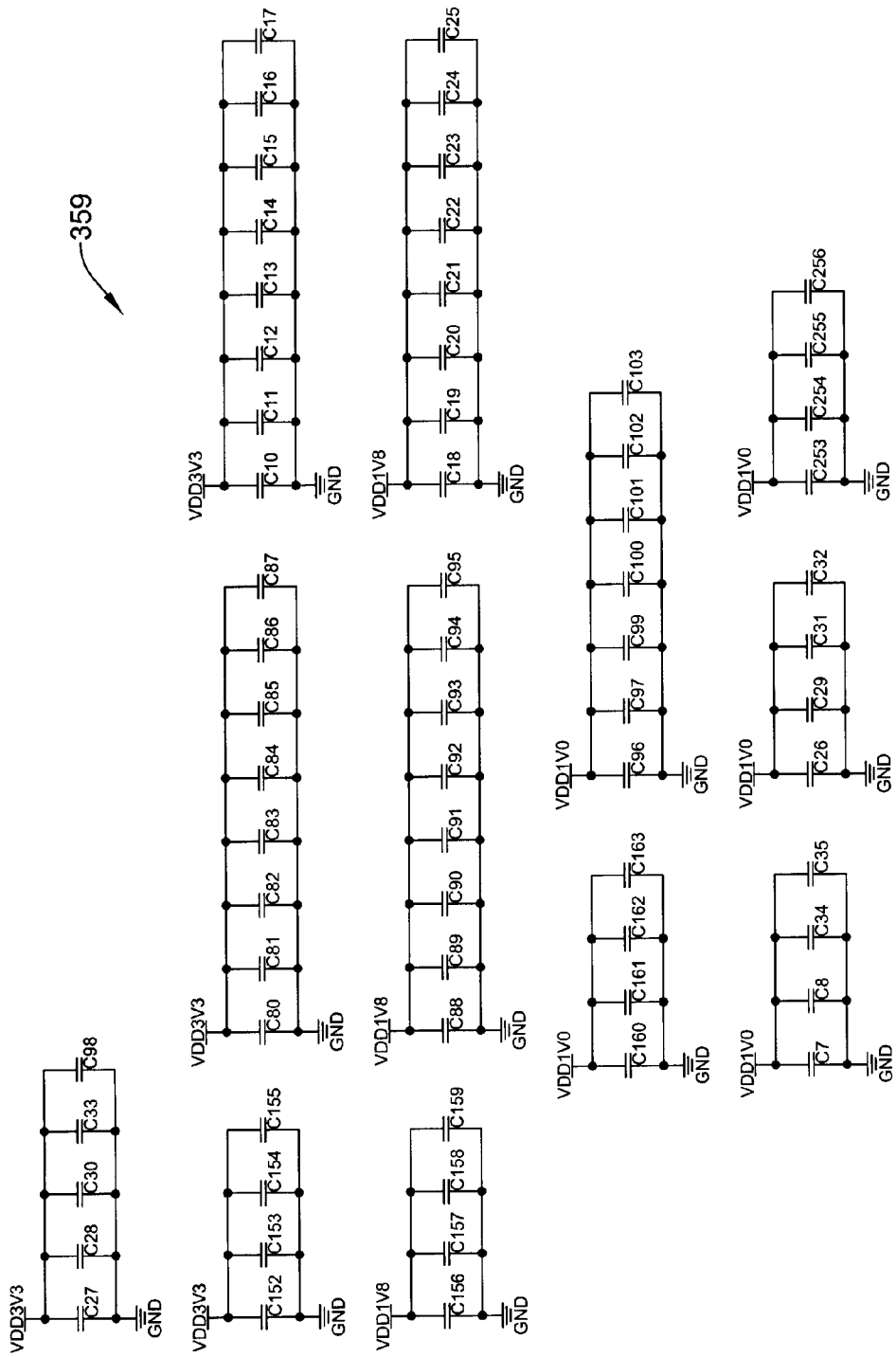
Figure 22G:
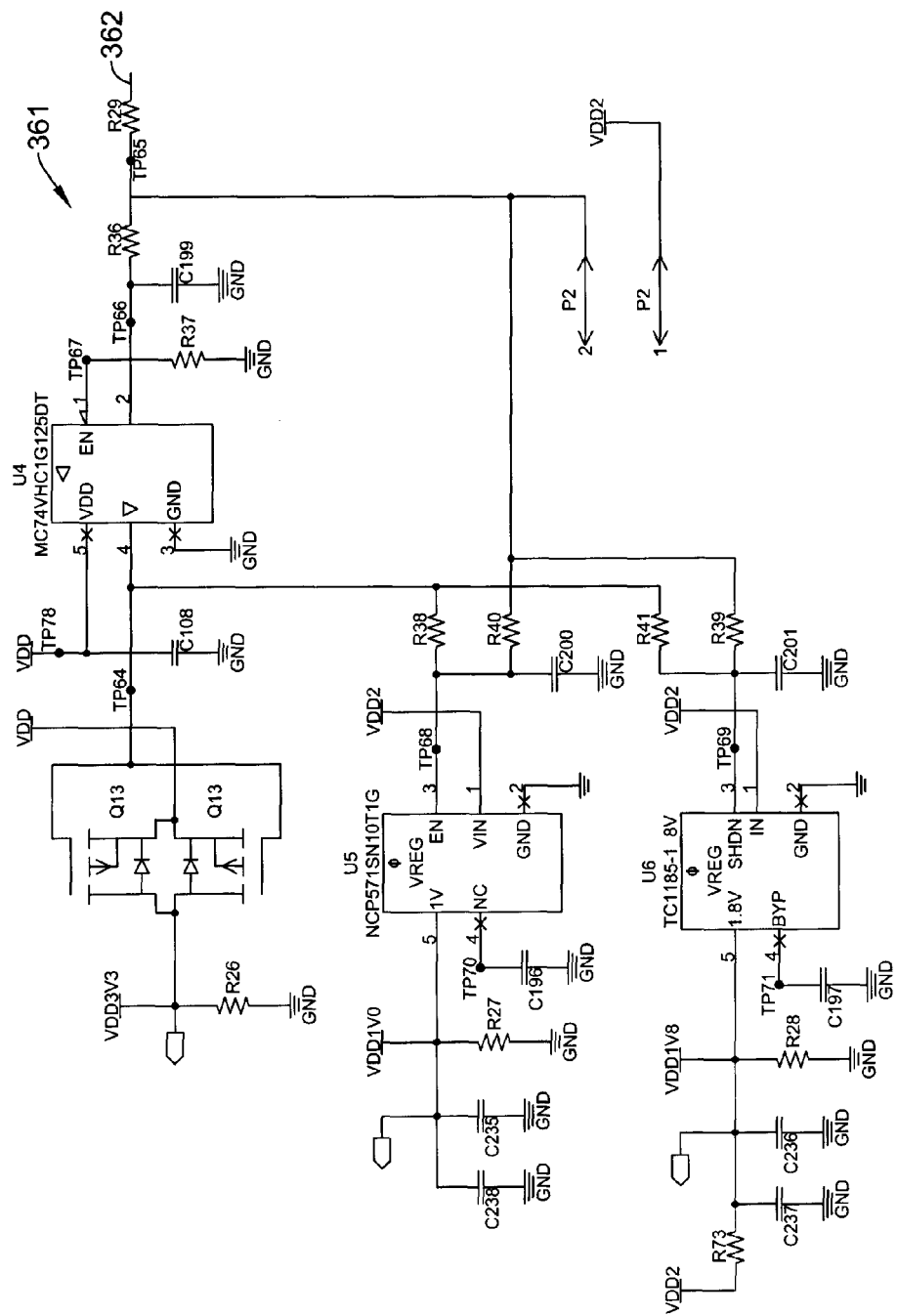
Figure 22H:
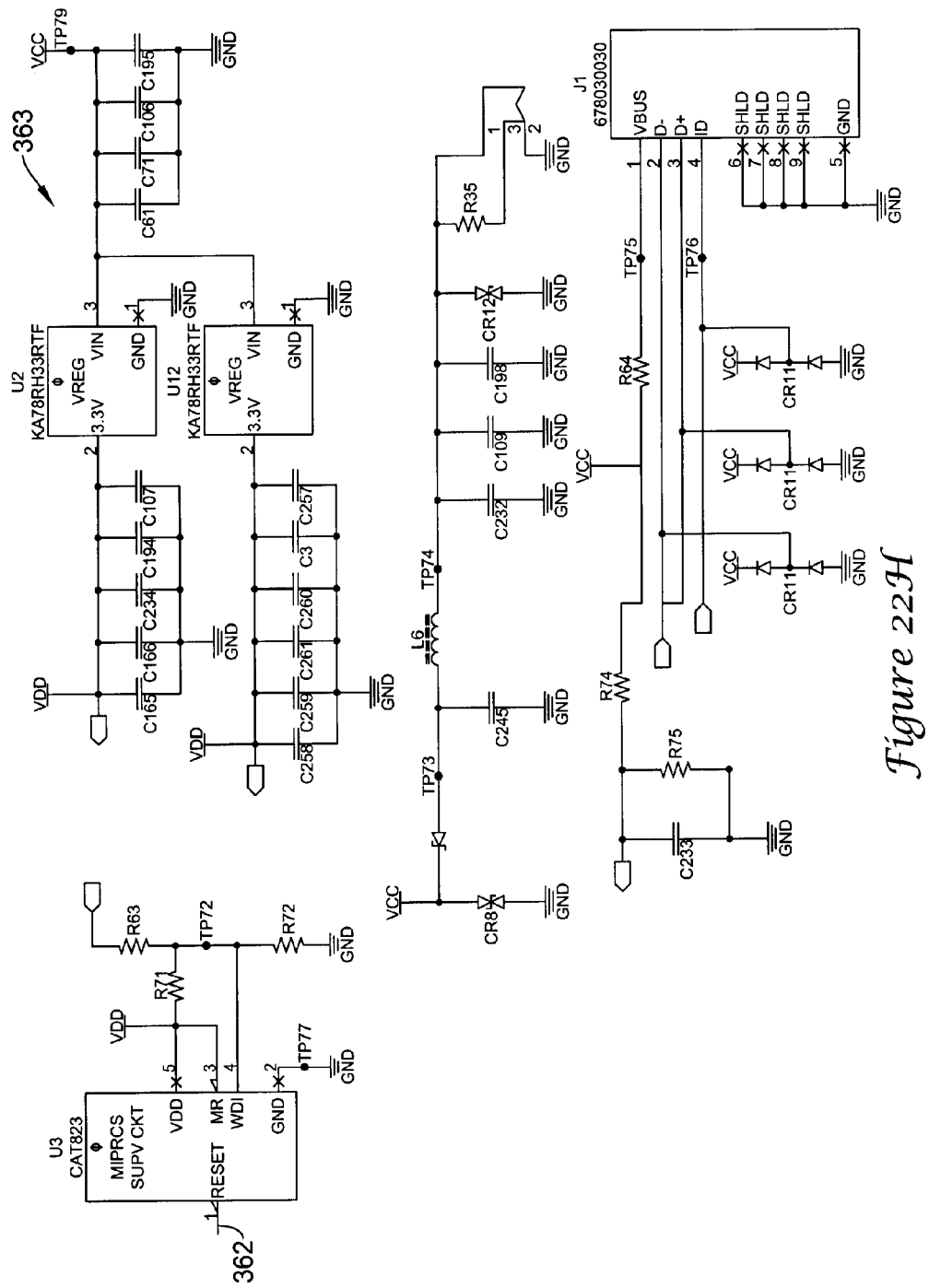
Figure 22I:
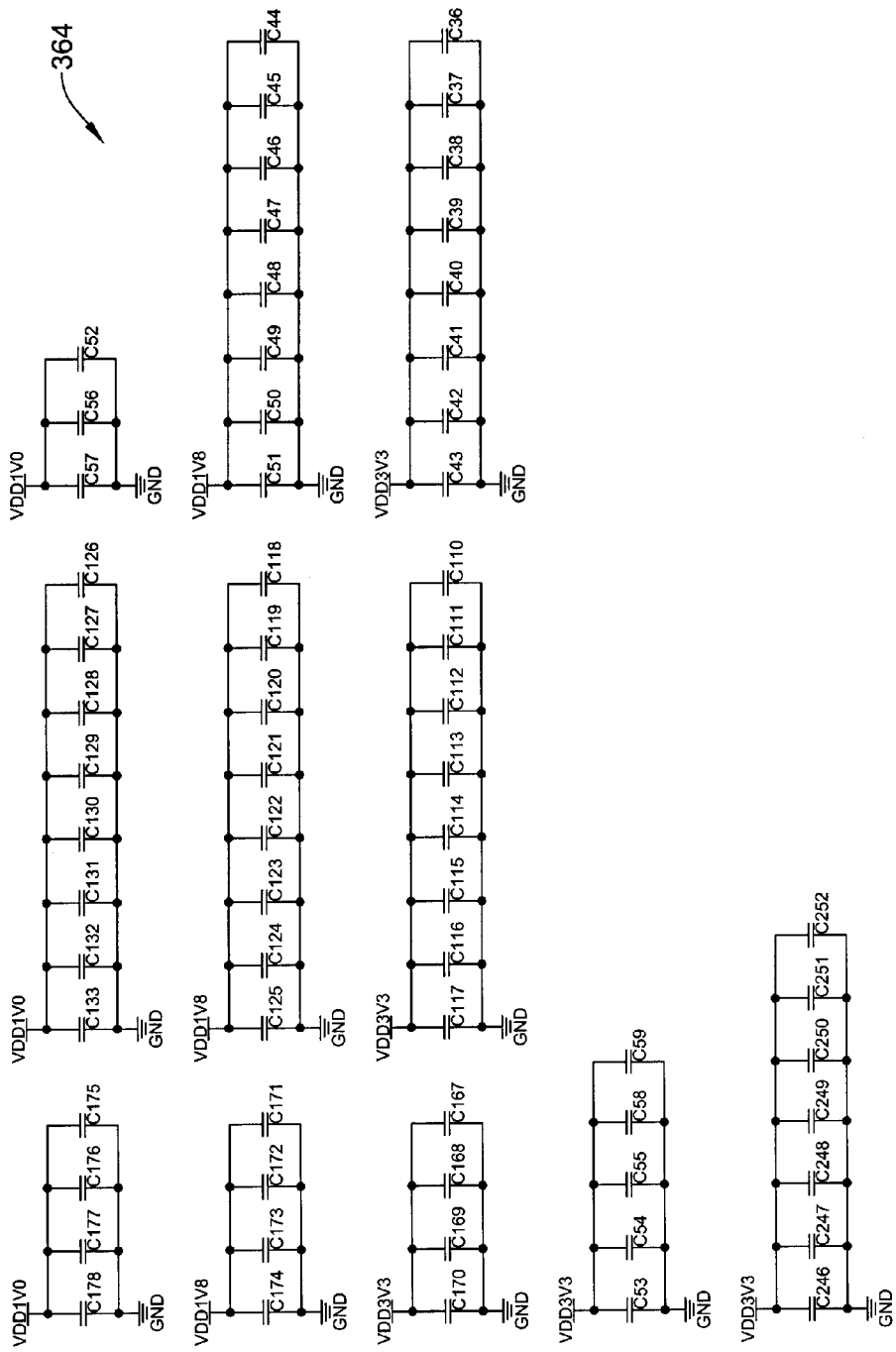
Figure 22J:
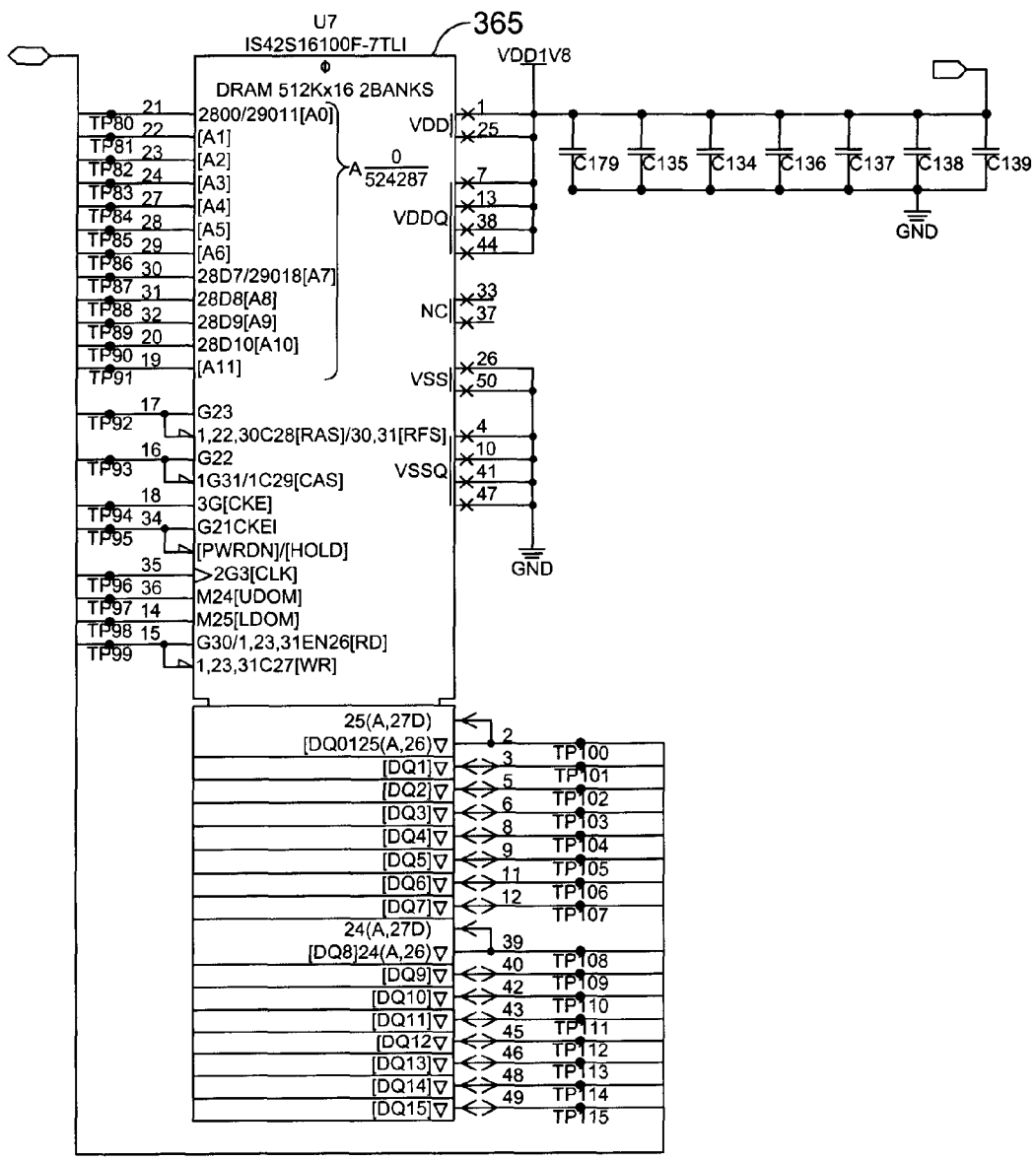
Figure 22K:
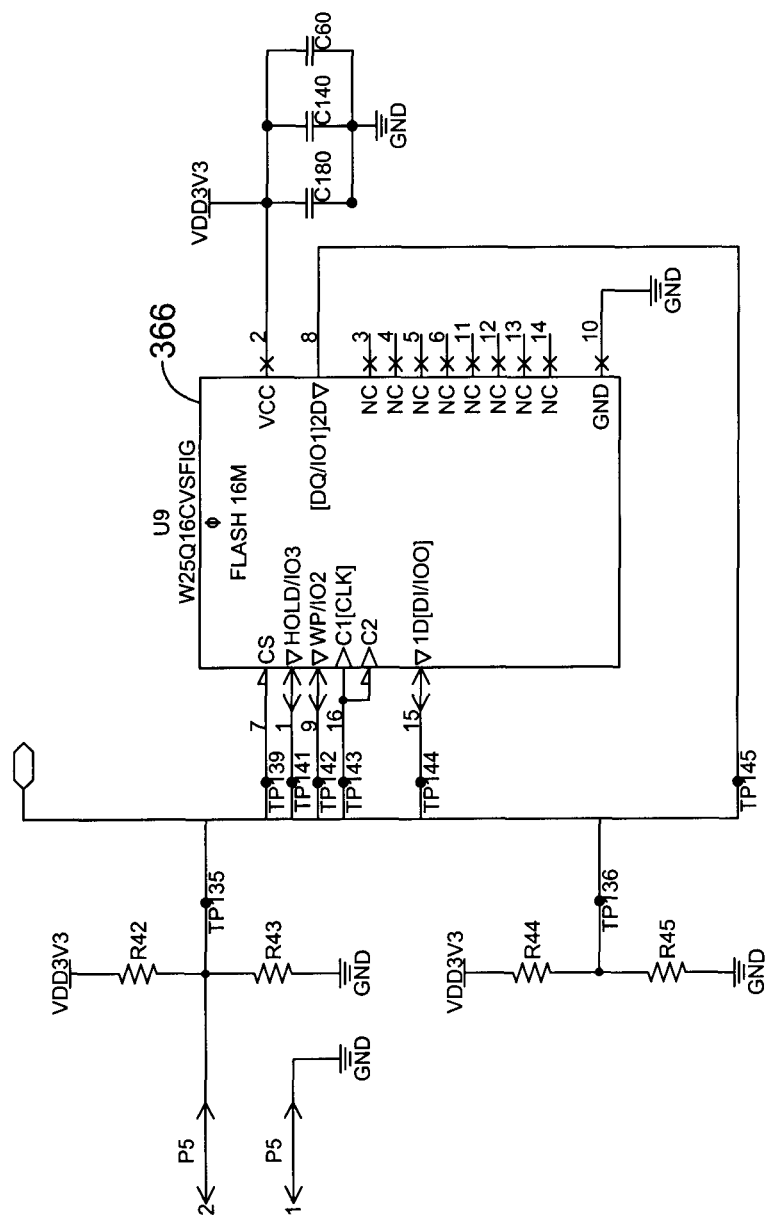
Figure 22L:
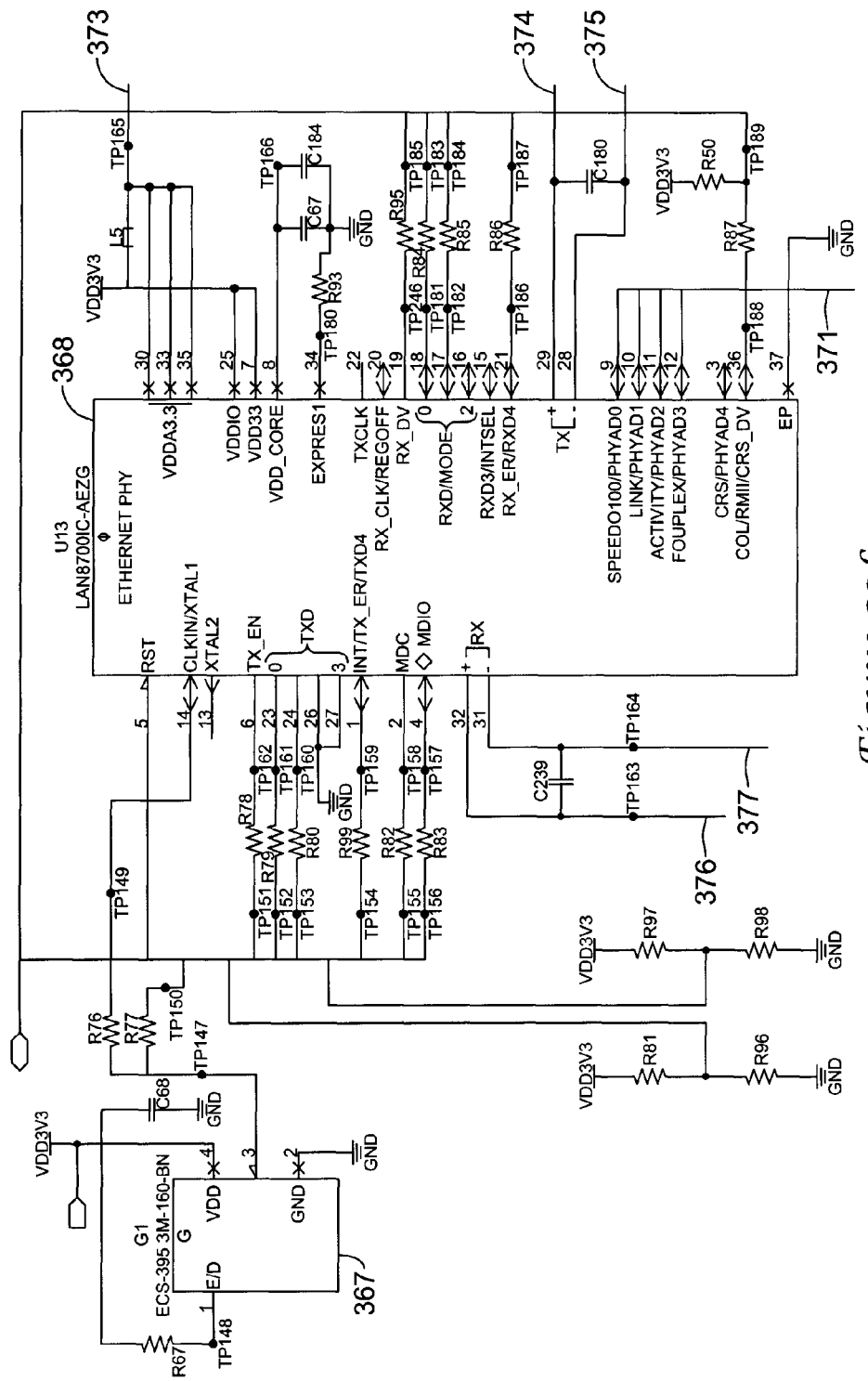
Figure 22M:
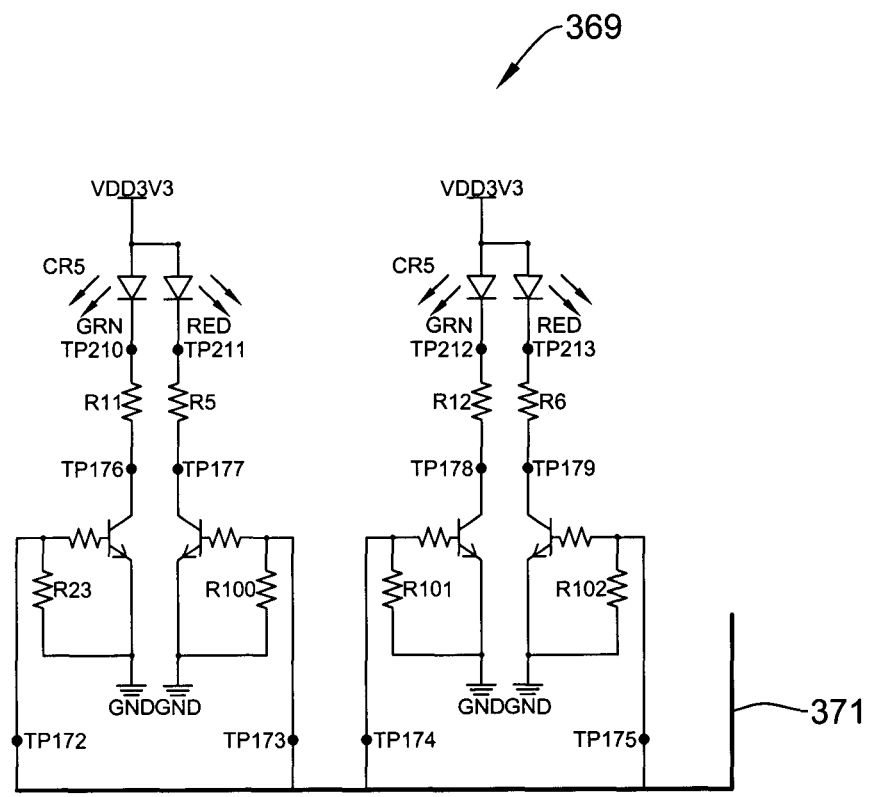
Figure 22N:
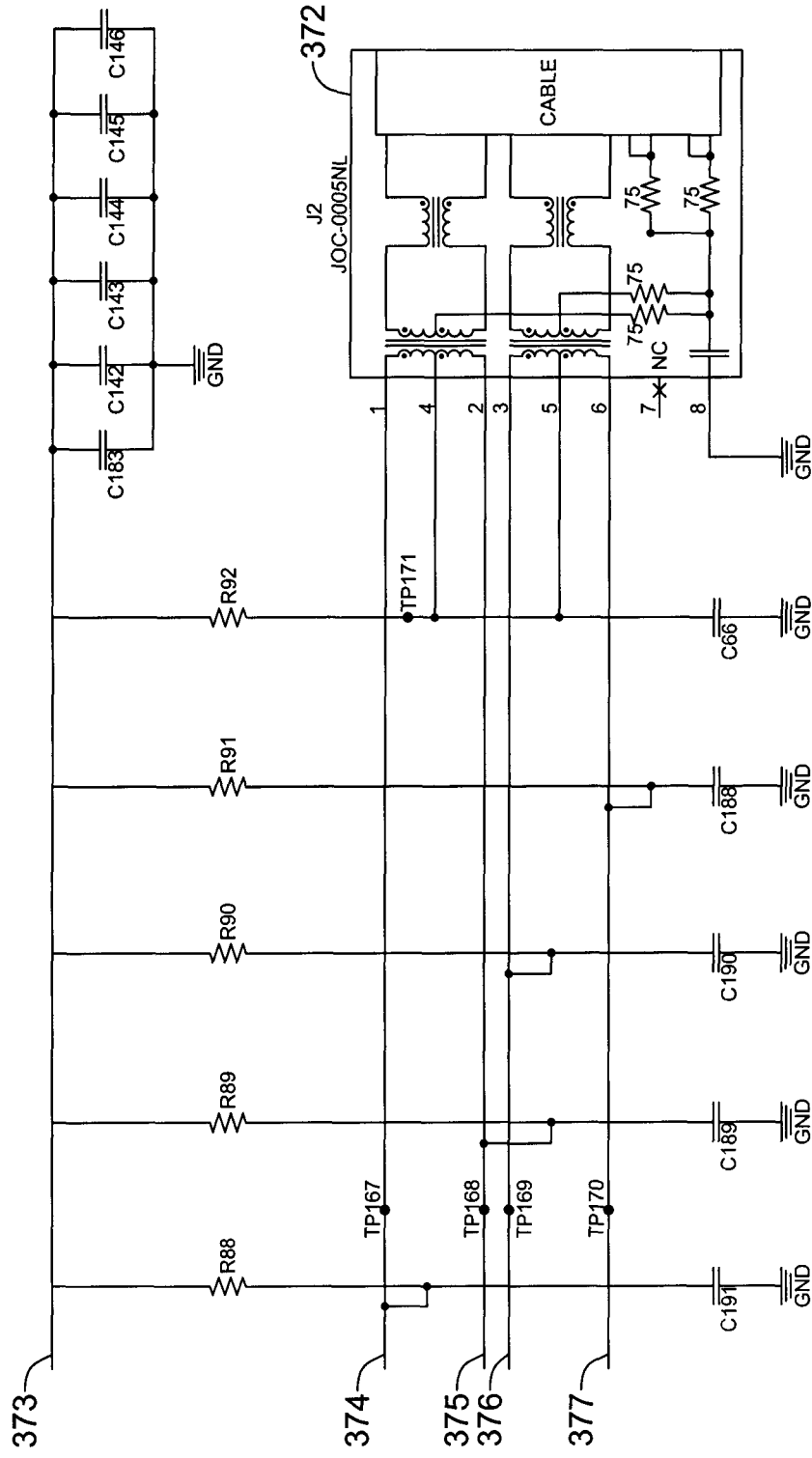
Figure 22O:
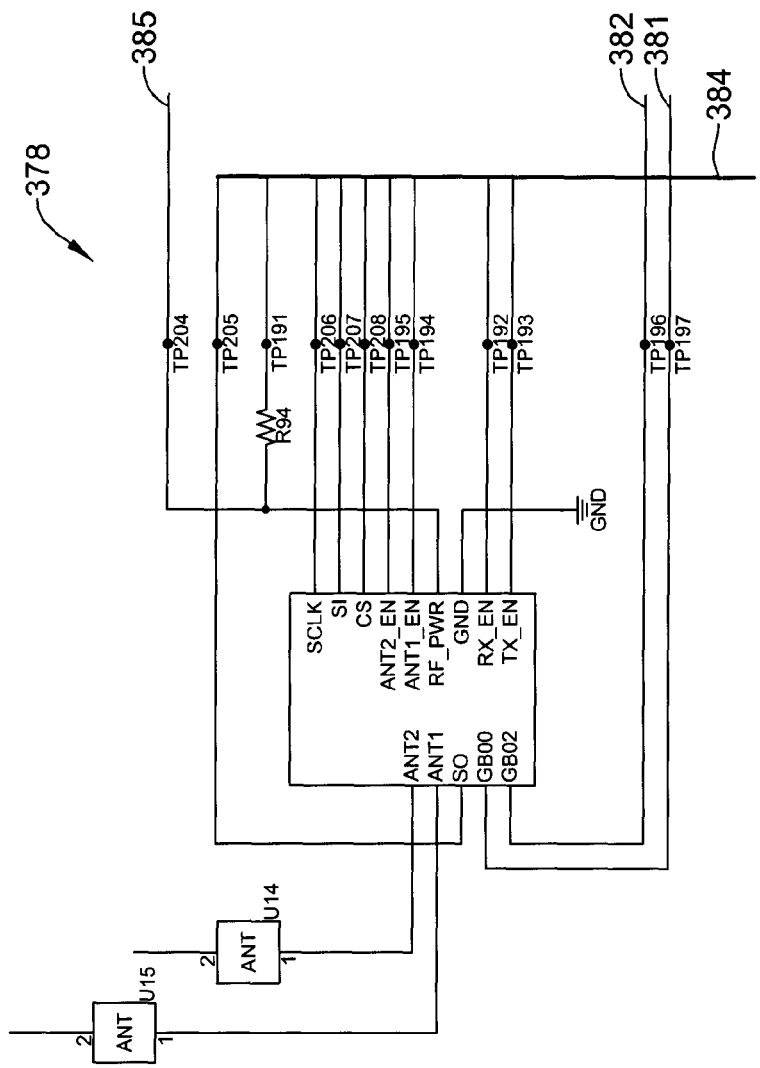
Figure 22P:
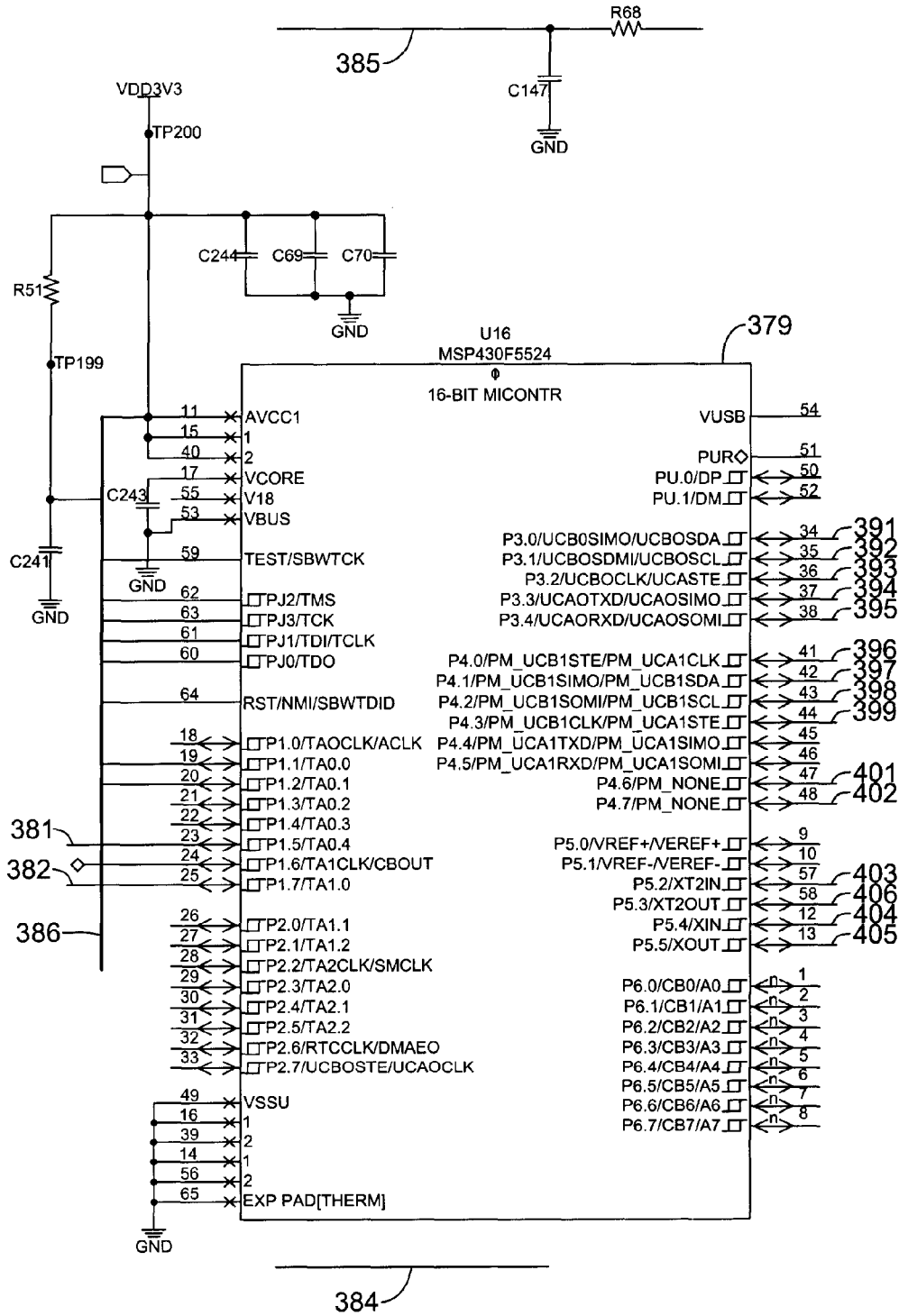
Figure 22Q:
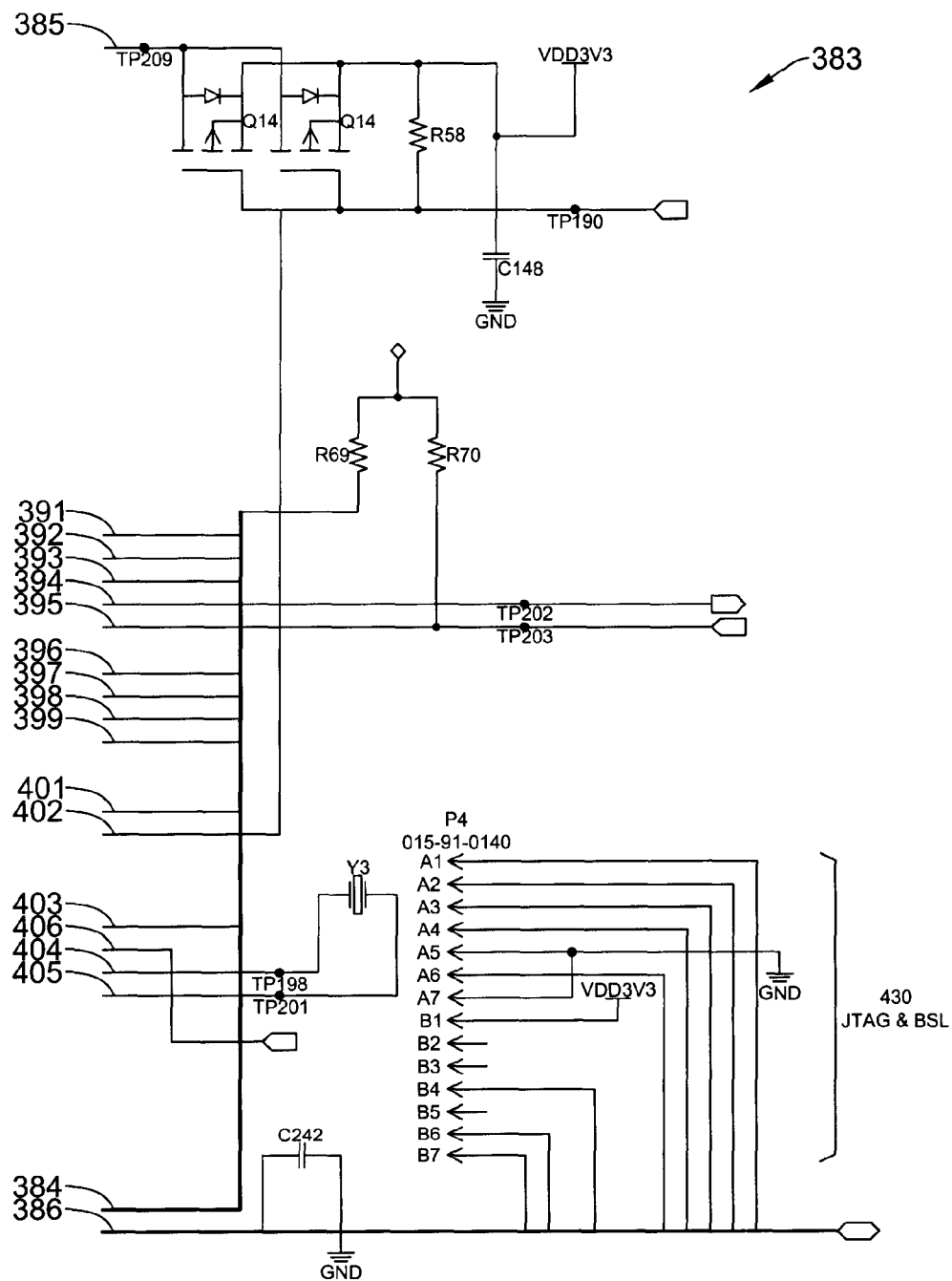
Figure 22R:
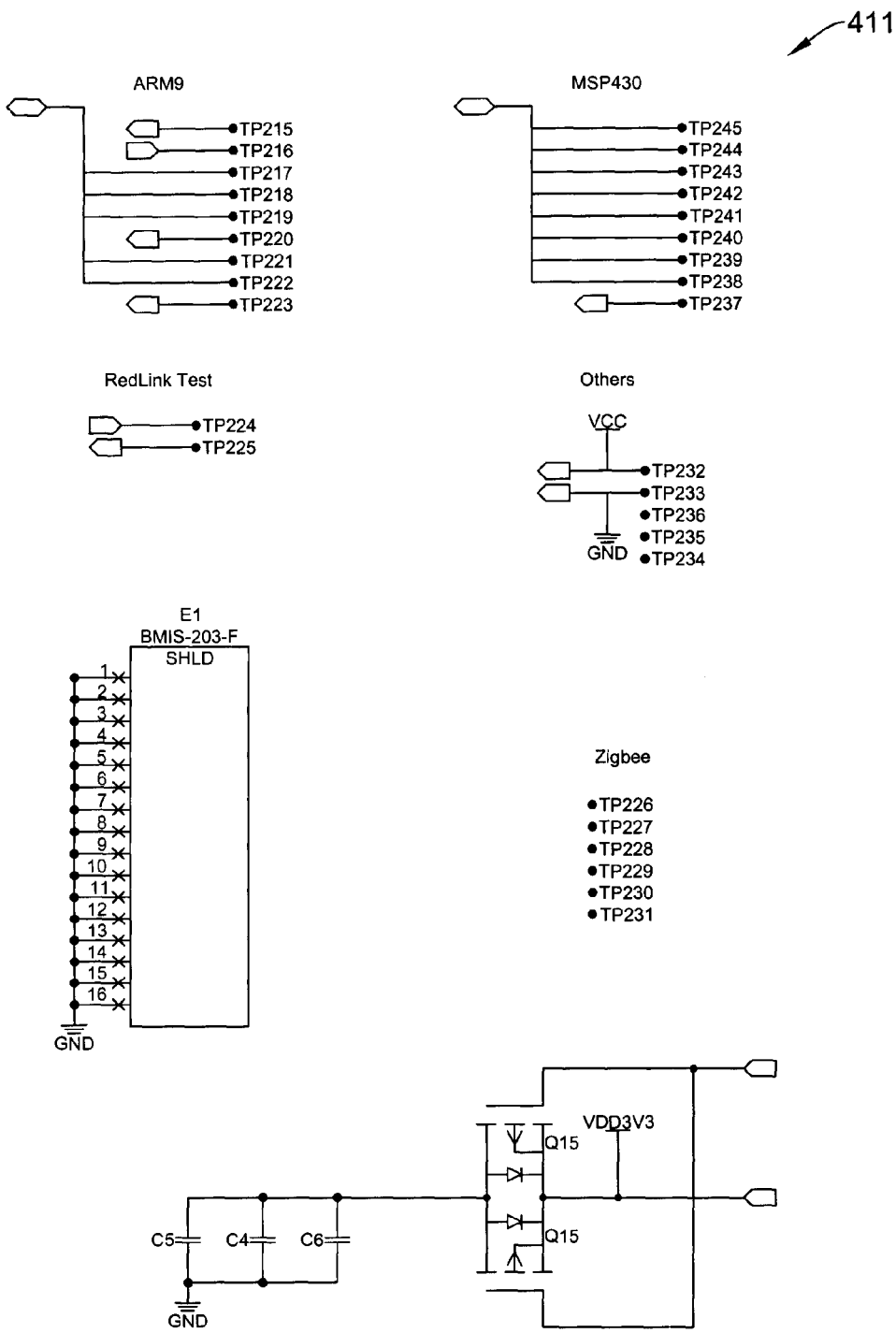

FIGS. 22a-22r are diagrams schematics of hardware for the present system. Designations in the Figures indicate connections among the items in the schematics. FIG. 22a is a diagram of a 32-bit microcontroller 345. FIG. 22b is a diagram of the circuitry 346 of the LED indicators for a gateway. Lines 347 and 348 in FIG. 22a are connected to lines 347 and 348, respectively, in FIG. 22b. FIG. 22c is a diagram of a 32-bit microcontroller 349. FIG. 22d shows a chip (#015-91-0200) 351 which may be connected to a 32 bit microcontroller 352 in FIG. 22e, via lines 353, 354, 355, 356, 357 and 358 between FIGS. 22d and 22e. FIG. 22f is a diagram of components 359 which may be connected to the respectively noted terminals to the circuitry of the diagrams in FIGS. 22d and 22e. FIGS. 22g and 22h are diagrams of power supply circuitry 361 and 363, respectively. The circuitry 361 and 363 may be connected to each other with a line 362. FIG. 22i is a diagram of components 364 which may be connected to the respectively noted terminals to the circuitry of the diagrams in FIGS. 22g and 22h. FIG. 22j is a diagram incorporating a DRAM 365 which may be pin compatible with an IS4ZVS16100E-10TLI (1.8V). FIG. 22k is a diagram incorporating a flash memory 366. FIG. 22l is a diagram incorporating an oscillator 367 and an ethernet PHY 368. FIG. 22m is a diagram of a LED circuit 369. Circuit 369 may be connected to ethernet PHY 368 via a line 371. FIG. 22n is a diagram of an interface circuit 372. Circuit 372 may be connected to ethernet PHY 368 via lines 373, 374, 375, 376 and 377. FIG. 22o is a diagram of an antenna circuitry 378. FIG. 22p is a diagram of a 16-bit microcontroller 379. Antenna circuitry 378 of FIG. 22o and microcontroller 379 of FIG. 22p may be connected by lines 381 and 382 between FIGS. 22o and 22p. FIG. 22q is a diagram of circuitry 383 which is associated with microcontroller 379 of FIG. 22p and antenna circuitry 378. Lines 384 and 385 of antenna circuitry of FIG. 22o are connected to lines 384 and 385 of circuitry 383 of FIG. 22q via lines 384 and 385 in the diagram of FIG. 22p. Circuitry 383 of FIG. 22q and microcontroller 379 of FIG. 22p are interconnected with lines 386, 391, 392, 393, 394, 395, 396, 397, 398, 399, 401, 402, 403, 404, 405 and 406, as indicated in the diagrams of FIGS. 22p and 22q. FIG. 22r is a diagram of circuitry items 411 which may be connected to other circuitry in one or more Figures of FIGS. 22a-22q.

To recap, a gateway control system for residential building equipment may incorporate a gateway device, heating, ventilation and air conditioning (HVAC) equipment connected to the gateway device, and a remote access mechanism connected to the gateway device and an internet cloud. Signals, for configuring and/or controlling the gateway, may be provided from the internet cloud to the remote access mechanism.

Commands from a service application to the internet cloud may remotely configure and/or control the gateway device and/or affect a behavior of the gateway device or start a process action. For each command, the service application may receive a response.

A command may be selected from a group consisting of no command, reset, send ping set or stop, cause registration, encryption mode, sync to host, device information, system configuration, clear fault, configuration file, firmware upgrade, stop parameter, and close data session.

The service application may send a keep-alive message periodically to ensure that a data circuit is kept open. The keep-alive message may be sent even if there is a command pending for or from the gateway device. The keep-alive message may use a command with no data.

A mobile application may be transparent to the service application protocol by providing similar behavior as the service application through a web session.

The gateway device may communicate wirelessly to a host. The host may be an item selected from a group consisting of thermostats, outdoor sensors, indoor sensors, and controllers for air handlers, air conditioners, heaters, and humidifiers.

The gateway device may have communications with a server. The communications may incorporate one or more data sessions and/or an asynchronous message. When a session is opened to activate a gateway device, a service application may request a data session to send a registration command. Successful registration may be declared when the gateway device has received a registration command with a registration flag from the service application. A check-in process for a pending data session may be virtually always active to ensure that the service application can request a data session. An exception may be when the service application sends a command to stop the check-in process.

The service application may send a data session request to a server infrastructure to establish a connection between the gateway device and the server. The data session request may incorporate a command, a media access control (MAC) identification (ID) and an expiration type of the data session request.

The system may further incorporate an item selected from a group consisting of a phone, web page, an electronic communication pad, a computer, a network, and so on. The item may be connected to the internet cloud. The item may provide commands to the gateway device.

An approach for gateway control for residential equipment may incorporate providing a gateway device, connecting heating, ventilation and air conditioning (HVAC) equipment to the gateway device, and connecting a remote access mechanism to the gateway device, an internet cloud and a network. Signals for configuring and/or controlling the gateway may be provided from the internet cloud or network to the remote access mechanism. Commands from a service application to the internet cloud may remotely configure and/or control the gateway device and/or affect a behavior of the gateway device or start a process action. For each command, the service application should receive a response.

A command may be selected from a group consisting of no command, reset, send ping set or stop, cause registration, encryption mode, sync to host, device information, system configuration, clear fault, configuration file, firmware upgrade, and close data session.

The service application may send a keep-alive message periodically to ensure that a data circuit is kept open. The keep-alive message may be sent even if there is a command pending for or from the gateway device. The keep-alive message may use a command with no data.

The gateway device may communicate wirelessly to a host. The host may be an item selected from a group consisting of thermostats, outdoor sensors, indoor sensors, and controllers for air handlers, air conditioners, heaters, and humidifiers.

The approach may further incorporate an item selected from a group consisting of a phone, web page, an electronic communication pad, a computer and a network. The item may be connected to the internet cloud. The item may provide commands to the gateway device.

A gateway control system for residential equipment may incorporate a gateway device and heating, ventilation and air conditioning (HVAC) equipment connected to the gateway device. The gateway may be connected to a network. Signals, for configuring and/or controlling the gateway, may be provided from the network. Commands from a service application to the network may remotely configure and/or control the gateway device, and/or affect a behavior of the gateway device or start a process action.

The system may further incorporate a service application that controls the gateway to perform specific operations by service application commands based on a protocol via the network. A stop parameter for a command may turn off transmission from the gateway by disabling the gateway. Disabling an encryption mode may be performed using a command.

The system may further incorporate an item selected from a group consisting of a phone, web page, an electronic communication pad, and a computer. The item may be connected to the network. The item may provide commands via the network to the gateway device.

In the present specification, some of the matter may be of a hypothetical or prophetic nature although stated in another manner or tense.

Although the present system and/or approach has been described with respect to at least one illustrative example, many variations and modifications will become apparent to those skilled in the art upon reading the specification. It is therefore the intention that the appended claims be interpreted as broadly as possible in view of the related art to include all such variations and modifications.

What is claimed is:

1. A gateway control system for residential building equipment comprising:
   a gateway device;
   heating, ventilation and air conditioning (HVAC) equipment connected to the gateway device; and
   a remote access mechanism connected to the gateway device and an internet cloud, the remote access mechanism is configured to:
      configure operation of the gateway device by setting running parameters of the gateway device;
      monitor the operation of the gateway device;
      obtain information about the gateway device and current running status of the gateway device based at least in part from the monitoring of the gateway device; and
      modify a behavior of the gateway device by adjusting the running parameters based at least in part on the information about the gateway device and the current running status of the gateway device; and
   wherein signals, for configuring and/or controlling the gateway, are provided from the internet cloud to the remote access mechanism.

2. The system of claim 1, wherein:
   commands from a service application of the remote access mechanism to the internet cloud remotely configure and/or control the gateway device and/or affect the behavior of the gateway device or start a process action; and
   for each command, the service application should receive a response.

3. The system of claim 2, wherein a command is selected from a group consisting of command, reset, send ping set or stop, cause registration, encryption mode, sync to host, device information, system configuration, clear fault, configuration file, firmware upgrade, stop parameter, and close data session.

4. The system of claim 2, wherein:
   the service application sends a keep-alive message periodically to ensure that a data circuit is kept open; and
   the keep-alive message is sent even if there is a command pending for or from the gateway device.

5. The system of claim 1, wherein modifying the behavior of the gateway device includes:
   identifying a message sending behavior of the gateway device based at least in part from the information about the gateway device and the current running status of the gateway device and adjusting the message sending behavior based at least in part on the identification of the message sending behavior;
   identifying that the gateway device has been hacked based at least in part on the information about the gateway device and the current running status of the gateway device and resetting the gateway device based at least in part on the identification that the gateway device has been hacked; and
   identifying an encryption mode of the gateway device based at least in part on the information about the gateway device and the current running status of the gateway device and adjusting the encryption mode of the gateway device based at least in part on the identification of the encryption mode.

6. The system of claim 1, wherein:
   the gateway device communicates wirelessly to a host; and
   the host is an item selected from a group consisting of thermostats, outdoor sensors, indoor sensors, and controllers for air handlers, air conditioners, heaters, and humidifiers.

7. The system of claim 1, wherein:
   the gateway device has communications with a server;
   the communications comprise one or more data sessions and/or an asynchronous message; and
   when a session is opened to activate a gateway device, a service application can request a data session to send a registration command.

8. The system of claim 1, wherein modifying the behavior of the gateway device includes:

identifying irregular operation of the gateway device based at least in part from the information about the gateway device and the current running status of the gateway device;

determining the gateway device has been hacked based at least in part on the identified irregular operation of the gateway device; and resetting the gateway device by adjusting the running parameters in response to the determination that the gateway device has been hacked.

9. The system of claim 1, wherein a service application of the remote access mechanism sends a data session request to a server infrastructure to establish a connection between the gateway device and the server.

10. The system of claim 1, further comprising:
an item selected from a group consisting of a phone, web page, an electronic communication pad, a computer and a network comprises the remote access mechanism; and
wherein:
the item is connected to the internet cloud; and
the item can provide commands to the gateway device.

11. An approach for gateway control for residential equipment comprising:
providing a gateway device;
connecting heating, ventilation and air conditioning (HVAC) equipment to the gateway device; and
connecting a remote access mechanism to the gateway device, an internet cloud and a network, the remote access mechanism is configured to:
configure operation of the gateway device by setting running parameters of the gateway device;
monitor the operation of the gateway device;
obtain information about the gateway device and current running status of the gateway device at least partially from the monitoring of the gateway device; and
modify a behavior of the gateway device by adjusting the running parameters based at least in part on the information about the gateway device and the current running status of the gateway device; and
wherein:
signals for configuring the operation and/or controlling the operation of the gateway are provided from the internet cloud or network to the remote access mechanism;
commands from a service application of the remote access mechanism to the internet cloud remotely configure and/or control the operation of the gateway device and/or affect a behavior of the gateway device or start a process action; and
for each command, the service application should receive a response.

12. The approach of claim 11, wherein a command is selected from a group consisting of command, reset, send ping set or stop, cause registration, encryption mode, sync to host, device information, system configuration, clear fault, configuration file, firmware upgrade, and close data session.

13. The approach of claim 11, wherein the service application sends a keep-alive message periodically to ensure that a data circuit is kept open.

14. The approach of claim 11, wherein:
the gateway device communicates wirelessly to a host; and
the host is an item selected from a group consisting of thermostats, outdoor sensors, indoor sensors, and controllers for air handlers, air conditioners, heaters, and humidifiers.

15. The approach of claim 11, wherein modifying the behavior of the gateway device includes:
identifying a message sending behavior of the gateway device based at least in part from the information about the gateway device and the current running status of the gateway device and adjusting the message sending behavior based at least in part on the identification of the message sending behavior;
identifying that the gateway device has been hacked based at least in part on the information about the gateway device and the current running status of the gateway device and resetting the gateway device based at least in part on the identification that the gateway device has been hacked; and
identifying an encryption mode of the gateway device based at least in part on the information about the gateway device and the current running status of the gateway device and adjusting the encryption mode of the gateway device based at least in part on the identification of the encryption mode.

16. A gateway control system for residential equipment comprising:
a gateway device; and
heating, ventilation and air conditioning (HVAC) equipment connected to the gateway device;
a service application communicatively coupled to the gateway device and configured to:
configure operation of the gateway device by setting running parameters of the gateway device;
monitor the operation of the gateway device;
obtain information about the gateway device and current running status of the gateway device based at least in part from the monitoring of the gateway device; and
modify a behavior of the gateway device by adjusting the running parameters based at least in part on the information about the gateway device and the current running status of the gateway device; and
wherein:
the gateway is connected to a network; and
signals, for configuring and/or controlling the gateway, are provided from the network.

17. The system of claim 16, wherein commands from the service application to the network remotely configure and/or control the gateway device; and/or affect a behavior of the gateway device or start a process action.

18. The system of claim 16, wherein modifying the behavior of the gateway device includes:
identifying a message sending behavior of the gateway device based at least in part from the information about the gateway device and the current running status of the gateway device and adjusting the message sending behavior based at least in part on the identification of the message sending behavior;
identifying that the gateway device has been hacked based at least in part on the information about the gateway device and the current running status of the gateway device and resetting the gateway device based at least in part on the identification that the gateway device has been hacked; and
identifying an encryption mode of the gateway device based at least in part on the information about the gateway device and the current running status of the gateway device and adjusting the encryption mode of the gateway device based at least in part on the identification of the encryption mode.

19. The system of claim 18, wherein modifying the behavior of the gateway device includes:
- identifying irregular operation of the gateway device based at least in part from the information about the gateway device and the current running status of the gateway device;
- determining the gateway device has been hacked based at least in part on the identified irregular operation of the gateway device; and
- resetting the gateway device by adjusting the running parameters in response to the determination that the gateway device has been hacked.

20. The system of claim 16, further comprising:
- an item selected from a group consisting of a phone, web page, an electronic communication pad, and a computer comprises the service application; and wherein:

the item is connected to the network; and the item can provide commands via the network to the gateway device.

\* \* \* \* \*